(12) United States Patent
Mock et al.

(10) Patent No.: US 7,990,410 B2
(45) Date of Patent: Aug. 2, 2011

(54) STATUS AND CONTROL ICONS ON A CONTINUOUS PRESENCE DISPLAY IN A VIDEOCONFERENCING SYSTEM

(75) Inventors: Wayne E. Mock, Round Rock, TX (US); Michael L. Kenoyer, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1273 days.

(21) Appl. No.: 11/405,371

(22) Filed: Apr. 17, 2006

(65) Prior Publication Data

US 2006/0256188 A1    Nov. 16, 2006

Related U.S. Application Data

(60) Provisional application No. 60/676,918, filed on May 2, 2005.

(51) Int. Cl.
    *H04N 7/14*      (2006.01)
(52) U.S. Cl. .................. 348/14.01; 709/204; 370/352
(58) Field of Classification Search .... 348/14.01–14.08; 709/204; 379/202.01
See application file for complete search history.

(56) References Cited

U.S. PATENT DOCUMENTS

| | | | |
|---|---|---|---|
| 5,398,309 A | 3/1995 | Atkins et al. | |
| 5,453,780 A | 9/1995 | Chen et al. | |
| 5,528,740 A | 6/1996 | Hill et al. | |
| 5,534,914 A | 7/1996 | Flohr et al. | |
| 5,537,440 A | 7/1996 | Eyuboglu et al. | |
| 5,572,248 A | 11/1996 | Allen et al. | |
| 5,594,859 A * | 1/1997 | Palmer et al. | 348/E7.081 |
| 5,600,646 A | 2/1997 | Polomski | |
| 5,617,539 A | 4/1997 | Ludwig et al. | |
| 5,625,410 A | 4/1997 | Washino et al. | |
| 5,629,736 A | 5/1997 | Haskell et al. | |
| 5,640,543 A | 6/1997 | Farrell et al. | |
| 5,649,055 A | 7/1997 | Gupta et al. | |
| 5,657,096 A | 8/1997 | Lukacs | |
| 5,684,527 A | 11/1997 | Terui et al. | |
| 5,689,641 A | 11/1997 | Ludwig et al. | |
| 5,719,951 A | 2/1998 | Shackleton et al. | |
| 5,737,011 A | 4/1998 | Lukacs | |
| 5,745,161 A * | 4/1998 | Ito | 348/14.09 |

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner* — Curtis Kuntz
*Assistant Examiner* — Maria El-Zoobi
(74) *Attorney, Agent, or Firm* — Meyertons Hood Kivlin Kowert & Goetzel, P.C.; Jeffrey C. Hood; Jason L. Burgess

(57) ABSTRACT

Various embodiments of a videoconferencing system and methods for visually indicating status and/or control information on a continuous presence display for a videoconference are described herein. In one embodiment, status information may be received from one or more of the endpoints of the videoconference and one or more status icons may be displayed on a continuous presence display in response to the status information. In another embodiment, a control icon may be displayed on the continuous presence display in order to visually indicate an endpoint that has been selected for controlling one or more of its properties.

16 Claims, 24 Drawing Sheets

U.S. PATENT DOCUMENTS

| | | | |
|---|---|---|---|
| 5,751,338 | A | 5/1998 | Ludwig, Jr. |
| 5,764,277 | A | 6/1998 | Loui et al. |
| 5,767,897 | A | 6/1998 | Howell |
| 5,812,789 | A | 9/1998 | Diaz et al. |
| 5,821,986 | A | 10/1998 | Yuan et al. |
| 5,831,666 | A | 11/1998 | Palmer et al. |
| 5,838,664 | A | 11/1998 | Polomski |
| 5,859,979 | A | 1/1999 | Tung et al. |
| 5,870,146 | A | 2/1999 | Zhu |
| 5,896,128 | A | 4/1999 | Boyer |
| 5,914,940 | A | 6/1999 | Fukuoka et al. |
| 5,995,608 | A | 11/1999 | Detampel, Jr. et al. |
| 6,038,532 | A | 3/2000 | Kane et al. |
| 6,043,844 | A | 3/2000 | Bist et al. |
| 6,049,694 | A | 4/2000 | Kassatly |
| 6,078,350 | A | 6/2000 | Davis |
| 6,101,480 | A | 8/2000 | Conmy et al. |
| 6,122,668 | A | 9/2000 | Teng et al. |
| 6,243,129 | B1 | 6/2001 | Deierling |
| 6,285,661 | B1 | 9/2001 | Zhu et al. |
| 6,288,740 | B1 | 9/2001 | Lai et al. |
| 6,292,204 | B1 | 9/2001 | Carleton et al. |
| 6,300,973 | B1 | 10/2001 | Feder et al. |
| 6,373,517 | B1 | 4/2002 | Davis et al. |
| 6,453,285 | B1 | 9/2002 | Anderson et al. |
| 6,480,823 | B1 | 11/2002 | Zhao et al. |
| 6,496,216 | B2 | 12/2002 | Feder et al. |
| 6,526,099 | B1 | 2/2003 | Christopoulos et al. |
| 6,535,604 | B1 | 3/2003 | Provencal et al. |
| 6,564,380 | B1 | 5/2003 | Murphy |
| 6,594,688 | B2 | 7/2003 | Ludwig et al. |
| 6,603,501 | B1 | 8/2003 | Parry et al. |
| 6,646,997 | B1 | 11/2003 | Baxley et al. |
| 6,654,045 | B2 | 11/2003 | Allen et al. |
| 6,657,975 | B1 | 12/2003 | Baxley et al. |
| 6,728,221 | B1 | 4/2004 | Shaffer et al. |
| 6,744,460 | B1 | 6/2004 | Nimri et al. |
| 6,757,005 | B1 | 6/2004 | Elbaz et al. |
| 6,760,415 | B2 | 7/2004 | Beecroft |
| 6,816,904 | B1 | 11/2004 | Ludwig et al. |
| 7,089,285 | B1 | 8/2006 | Drell |
| 7,185,054 | B1* | 2/2007 | Ludwig et al. ............ 709/204 |
| 7,304,985 | B2* | 12/2007 | Sojka et al. .............. 370/352 |
| 7,574,472 | B2* | 8/2009 | Biby et al. ............... 709/204 |
| 2002/0188731 | A1 | 12/2002 | Potekhin et al. |
| 2003/0067908 | A1* | 4/2003 | Mattaway et al. ......... 370/352 |
| 2003/0105820 | A1* | 6/2003 | Haims et al. ............. 709/205 |
| 2003/0174146 | A1 | 9/2003 | Kenoyer |
| 2004/0183897 | A1 | 9/2004 | Kenoyer et al. |
| 2006/0013416 | A1 | 1/2006 | Truong et al. |
| 2006/0147009 | A1* | 7/2006 | Greenlee et al. ........ 379/202.01 |
| 2007/0086445 | A1* | 4/2007 | Mattaway et al. ......... 370/352 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; http://www.medlib.iupui.edu/techsupport/vc/vcinstructions.html; 2002; 3 pages.

E. J. Addeo, A. D. Gelman and A. B. Dayao; "A Multi-media Multi-point Communication Services Capability for Broadband Networks"; Mar. 1987; pp. 423-428; Bell Communications Research; Morristown, NJ.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. Cash; "Montage: Continuous Presence Teleconferencing Utilizing Compressed Domain Video Bridging"; IEEE International Conference on Communication; Jun. 1995; pp. 572-581; AT&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing—An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven McCanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

* cited by examiner

STATUS AND CONTROL ICONS ON A CONTINUOUS PRESENCE DISPLAY IN A VIDEOCONFERENCING SYSTEM

PRIORITY CLAIM

This application claims priority to U.S. Provisional Patent Application Ser. No. 60/676,918, titled "Audio and Video Conferencing", which was filed May 2, 2005, whose inventors were Michael L. Kenoyer, Wayne Mock, and Patrick D. Vanderwilt, and which is hereby incorporated by reference in its entirety as though fully and completely set forth herein.

BACKGROUND OF THE INVENTION

1. Field of the Invention

The present invention relates to videoconferencing systems.

2. Description of the Related Art

Videoconferencing systems allow people at two or more different locations to participate in a conference so that the people at each location can see and hear the people at the other location(s). Videoconferencing systems typically perform digital compression of audio and video signals in real time. The hardware or software that performs compression is called a codec (coder/decoder). The resulting digital stream of bits representing the audio and video data are subdivided into packets, which are then transmitted through a network of some kind (usually ISDN or IP) to the other locations or endpoints participating in the videoconference.

Videoconferences can be performed using dedicated videoconferencing equipment, i.e., devices especially designed for videoconferencing. For example, a dedicated videoconferencing device may include input ports for receiving video signals from local video sources and audio signals from local microphones, network ports for receiving the remote audio/video streams from and sending the local audio/video stream to the remote endpoints, and output ports for displaying the video data on a display device and sending the audio data to an audio output device. The dedicated videoconferencing device may also include specialized software and hardware for compressing and decompressing audiovisual data, generating a composite image of the video streams from the various participants, etc. The dedicated videoconferencing device may also include an interface allowing users to interact with the videoconferencing equipment, e.g., to pan, tilt, and zoom cameras, select a video input source to send to the remote endpoints, control volume levels, control placement of video windows on the display device, etc.

Videoconferences can also be performed using non-dedicated equipment, e.g., a general purpose computer system. For example, a typical desktop PC can be configured to add-on hardware boards and/or software to enable the PC to participate in a videoconference.

Various standards have been established to enable the videoconferencing systems at each endpoint to communicate with each other. In particular, the International Telecommunications Union (ITU) has specified various videoconferencing standards. These standards include:

H.320—This is known as the standard for public switched telephone networks (PSTN) or videoconferencing over integrated services digital networks (ISDN) basic rate interface (BRI) or primary rate interface (PRI). H.320 is also used on dedicated networks such as TI and satellite-based networks.

H.323—This is known as the standard for video over Internet Protocol (IP). This same standard also applies to voice over IP (VoIP).

H.324—This is the standard for transmission over POTS (Plain Old Telephone Service), or audio telephony networks.

In recent years, IP-based videoconferencing has emerged as a communications interface and standard commonly utilized by videoconferencing equipment manufacturers. Due to the price point and proliferation of the Internet, and broadband in particular, there has been strong growth and use of H.323 IP-based videoconferencing. H.323 has the advantage that it is accessible to anyone with a high speed Internet connection, such as a DSL connection, cable modem connection, or other high speed connection.

SUMMARY

A videoconference may include a plurality of endpoints that share video signals among each other. At a given endpoint, there may be a display device that displays the video signals from the various endpoints. For example, a videoconferencing device at a given endpoint may receive a plurality of remote video signals from a plurality of remote endpoints and display the remote video signals simultaneously with each other on a display device, e.g., to form a continuous presence display. As another example, a videoconferencing device at a given endpoint may receive one or more remote video signals from one or more remote endpoints and display the one or more remote video signals simultaneously with a local video signal from a local video source (e.g., a video source at the local endpoint) to form a continuous presence display.

Various embodiments of a method for visually indicating status information on a continuous presence display in a videoconferencing system are described herein. The method may comprise receiving status information from one or more of the endpoints of the videoconference and displaying one or more status icons on the display device in response to the status information. Each status icon may correspond to a respective one of the endpoints and may have a graphical appearance that graphically indicates the status information received from the respective endpoint. Each status icon may also be displayed proximally to the displayed video signal of the respective endpoint to which it corresponds. Displaying each status icon proximally to the displayed video signal of the respective endpoint to which it corresponds may visually associate the status icons with their corresponding endpoints. This may allow the participants in the video conference to easily learn the status information for the various endpoints in the videoconference simply by looking at the various status icons displayed proximally to the respective video signals displayed on the continuous presence display.

Also described herein are various embodiments of a method for visually indicating control of an endpoint in the videoconference. For example, the videoconferencing device at a given endpoint may receive user input selecting a particular endpoint as an endpoint to control, e.g., in order to control one or more properties of the endpoint. As one example, the user (e.g., operator of the videoconferencing device) may select an endpoint in order to control various properties of a camera at the endpoint. In response to the user selecting the endpoint, the videoconferencing device may display a control icon on the continuous presence display, where the control icon is displayed proximally to the video signal of the selected endpoint. The control icon may have a graphical appearance that graphically indicates that the endpoint is currently selected for controlling one or more of its properties. The control icon displayed proximally to the video signal of the selected endpoint may serve as a visual indicator to the operator of the videoconferencing device that that particular endpoint is currently selected for control.

Various embodiments of a videoconferencing system which utilizes the aforementioned methods are also described herein.

BRIEF DESCRIPTION OF THE DRAWINGS

A better understanding of the present invention may be obtained when the following detailed description is considered in conjunction with the following drawings, in which.

Figure 1:
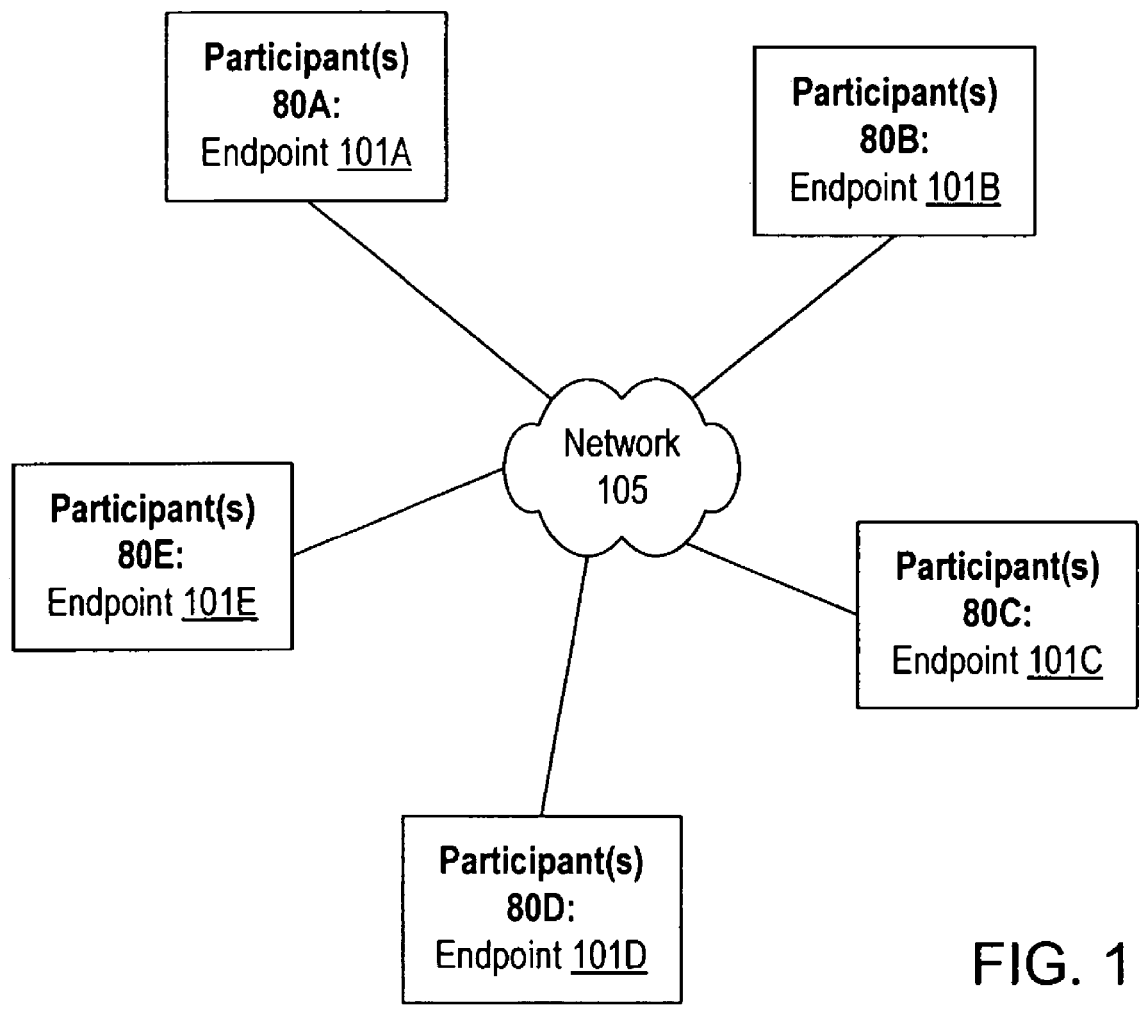
FIG. 1 is a block diagram illustrating one embodiment of a videoconference in which there are a plurality of endpoints.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

U.S. Provisional Patent Application Ser. No. 60/676,918, titled "Audio and Video Conferencing", which was filed May 2, 2005, whose inventors were Michael L. Kenoyer, Wayne Mock, and Patrick D. Vanderwilt, is hereby incorporated by reference in its entirety as though fully and completely set forth herein.

U.S. patent application Ser. No. 11/252,238, titled "Video Conferencing System Transcoder", which was filed Oct. 17, 2005, whose inventors were Michael L. Kenoyer and Michael V. Jenkins, is hereby incorporated by reference in its entirety as though fully and completely set forth herein.

U.S. patent application Ser. No. 11/251,084, titled "Speakerphone", which was filed Oct. 14, 2005, whose inventor was William V. Oxford, is hereby incorporated by reference in its entirety as though fully and completely set forth herein.

U.S. patent application Ser. No. 11/251,086, titled "Speakerphone Supporting Video and Audio Features", which was filed Oct. 14, 2005, whose inventors were Michael L. Kenoyer, Craig B. Malloy and Wayne E. Mock, is hereby incorporated by reference in its entirety as though fully and completely set forth herein.

U.S. patent application Ser. No. 11/251,083, titled "High Definition Camera Pan Tilt Mechanism", which was filed Oct. 14, 2005, whose inventors were Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

As described in more detail below, a videoconference may include a plurality of endpoints that share video signals among each other. At a given endpoint, there may be a display device that displays the video signals from the various endpoints. As used herein, the term "continuous presence display" refers to simultaneously displaying video signals from multiple endpoints in a videoconference on a display screen of a display device. For example, a videoconferencing device at a given endpoint may receive a plurality of remote video signals from a plurality of remote endpoints and display the remote video signals simultaneously with each other on a display device to form a continuous presence display. As another example, a videoconferencing device at a given endpoint may receive one or more remote video signals from one or more remote endpoints and display one or more remote video signals simultaneously with a local video signal from a local video source (e.g., a video source at the local endpoint) to form a continuous presence display.

Various embodiments of a method for visually indicating status information on a continuous presence display in a videoconferencing system are described herein. As described in more detail below, the method may comprise receiving status information from one or more of the endpoints of the videoconference and displaying one or more status icons on the display device in response to the status information. Each status icon may correspond to a respective one of the endpoints and may have a graphical appearance that graphically indicates the status information received from the respective endpoint. Each status icon may also be displayed proximally to the displayed video signal of the respective endpoint to which it corresponds. Displaying each status icon proximally to the displayed video signal of the respective endpoint to which it corresponds may visually associate the status icons with their corresponding endpoints. This may allow the participants in the video conference to easily learn the status information for the various endpoints in the videoconference simply by looking at the various status icons displayed proximally to the respective video signals displayed on the continuous presence display.

Also described herein are various embodiments of a method for visually indicating control of an endpoint in the videoconference. For example, the videoconferencing device at a given endpoint may receive user input selecting a particular endpoint as an endpoint to control, e.g., in order to control one or more properties of the endpoint. As one example, the user (e.g., operator of the videoconferencing device) may select an endpoint in order to control various properties of a camera at the endpoint. In response to the user selecting the endpoint, the videoconferencing device may display a control icon on the continuous presence display, where the control icon is displayed proximally to the video signal of the selected endpoint. The control icon may have a graphical appearance that graphically indicates that the endpoint is currently selected for controlling one or more of its properties. The control icon displayed proximally to the video signal of the selected endpoint may serve as a visual indicator to the operator of the videoconferencing device that that particular endpoint is currently selected for control.

Various embodiments of a videoconferencing system which utilizes the aforementioned methods are also described herein.

Referring now to FIG. 1, a block diagram illustrating one embodiment of a videoconference is shown. As used herein, the term "videoconference" refers to a conference between participants at two or more locations, wherein video information is sent from at least one of the locations to one or more of the other locations. For example, the video information sent from a given location may represent a live video stream (video signal) received from a camera or other video source, where the video information is received by the other locations and used to reproduce the live video stream on a display device, such as a television or computer monitor. In addition to video information, audio information may also be sent from at least one of the locations to one or more of the other locations.

The various locations of the videoconference participants are also referred to herein as "endpoints" in the videoconference. For example, FIG. 1 illustrates an exemplary videoconference in which participants 80A-80E are located at respective endpoints 101A-101E. The term "remote endpoint" is relative to a given endpoint in the videoconference and refers to the other endpoints in the videoconference. For example, endpoints 100B-101E are remote endpoints with respect to endpoint 101A, while endpoints 101A-101D are remote endpoints with respect to endpoint 101E.

Although there are five endpoints 101 in this example, in other examples there may be any number of endpoints (as long as there are at least two). Also, the participants 80 at a given endpoint 101 may include any number of people. In one embodiment, each endpoint 101 includes at least one person as a participant 80. In other embodiments, one or more of the endpoints 101 may have no persons present as participants 80. For example, video information from a camera stationed at an endpoint 101A with no participants 80 may be sent to other endpoints 101 and viewed by participants 80 at the other endpoints 101, where the other endpoints 101 also share video information among each other.

In one embodiment, each endpoint 101 may send video information to all of the remote endpoints 101. In another embodiment, one or more of the endpoints may send video information to only a subset, but not all, of the remote endpoints. As one example, endpoints 101B-101E may each send video information only to endpoint 101A, and endpoint 101A may send video information to each of the endpoints 101B-101E. As described below, in some embodiments, each endpoint 101 may send video information to a device referred to as a Multipoint Control Unit (MCU). The MCU may then relay the received video information to the various endpoints 101. The MCU may be located at one of the endpoints 101 or may be in a separate location from any of the endpoints 101.

In another embodiment, one or more of the endpoints 101 may not send video information to any remote endpoint. As one example, a given endpoint 101 may receive video information from one or more of the remote endpoints, but may not send video information to any remote endpoint. As another example, a given endpoint 101 may not send video information to any remote endpoint or receive video information from any remote endpoint. In this example, the given endpoint 101 may participate in the videoconference by sharing audio information only, e.g., may receive audio information from one or more of the remote endpoints, as well as possibly sending audio information to one or more of the remote endpoints.

As noted above, in addition to sharing video information, the endpoints 101 may also share audio information. In one embodiment, each endpoint 101 that sends video information to one or more remote endpoints may also send audio information to the one or more remote endpoints 101. In one embodiment, each endpoint 101 may receive both video information and audio information from all of the other endpoints 101. In another embodiment, one or more of the endpoints 101 may send video information to one or more remote endpoints, but without sending audio information to the one or more remote endpoints. In another embodiment, one or more of the endpoints 101 may send audio information to one or more remote endpoints, but without sending video information to the one or more remote endpoints.

It will be appreciated that many other possible permutations of sending video and/or audio information among the various endpoints 101 in the videoconference are possible, other than the particular ones described above.

As noted above, in some embodiments, a device referred to as a Multipoint Control Unit (MCU) may be used to facilitate sharing video and audio information among the endpoints 101. The MCU may act as a bridge that interconnects calls from several endpoints. For example, all endpoints may call the MCU, or the MCU can also call the endpoints which are going to participate in the videoconference. An MCU may be located at one of the endpoints 101 of the videoconference or may be in a separate location from any endpoint 101. In one embodiment, the MCU may be embedded in a videoconferencing device at one of the endpoints 101.

Figure 2:
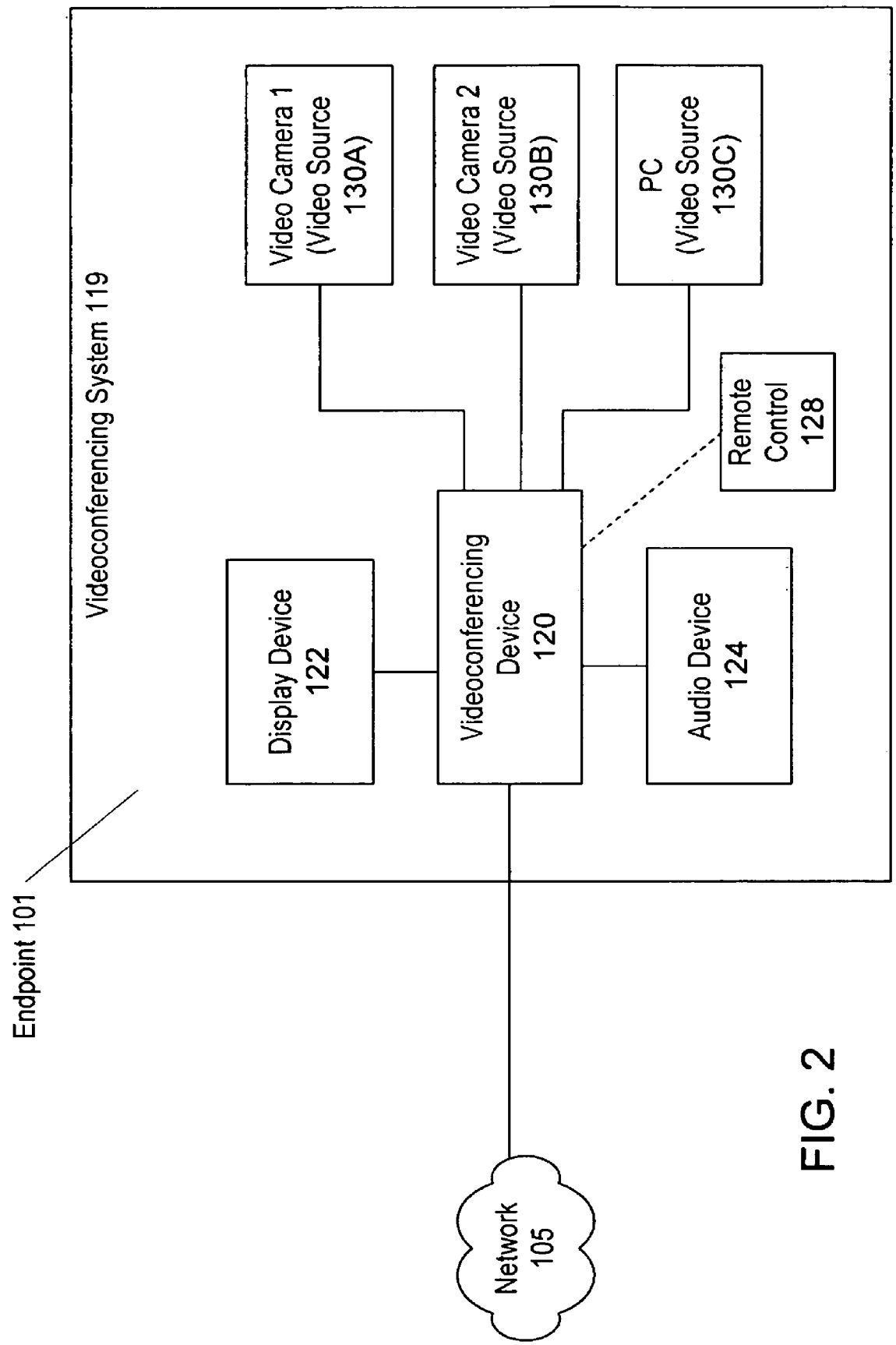
FIG. 2 illustrates one embodiment of a videoconferencing system that is operable to perform a method for displaying status icons on a continuous presence display and/or a method for displaying control icons on the continuous presence display.

At least one of the endpoints 101 in FIG. 1 may utilize a videoconferencing system 119 which is operable to perform one or more of the methods described herein for displaying status and/or control icons on a continuous presence display. FIG. 2 illustrates one embodiment of such a videoconferencing system 119.

As shown, the videoconferencing system 119 includes a videoconferencing device 120. As used herein, the term "videoconferencing device" refers to a device operable to receive video information from and send video information to remote endpoints in a videoconference. A videoconferencing device may also receive audio information from and send audio information to the remote endpoints.

In the example of FIG. 2, the videoconferencing device 120 receives a plurality of video input signals from a plurality of video sources 130, e.g., via inputs on the videoconferencing device 120. In various embodiments, a video source 130 may comprise any kind of device operable to produce a video signal. In the illustrated example, the video sources 130 include two video cameras and a personal computer (PC), e.g., where the PC provides a video signal through a video card. Other examples of possible video sources 130 include a DVD player, a VCR, or other device operable to produce a video signal. In various embodiments, the videoconferencing device 120 may receive respective video input signals from any number of video sources 130.

The videoconferencing device 120 may be operable to select one (or more) of the video input signals received from the video sources 130 as a video input signal to send to one or more of the remote endpoints in the videoconference: Thus, the video sources 130 are also referred to herein as "local video sources" and the respective video input signals that they produce are also referred to herein as "local video signals". It is noted, however, that the local video sources may or may not be located physically together with or proximally to the videoconferencing device 120. For example, in one embodiment, one or more of the local video sources 130 may be located far away from the videoconferencing device 120 and may connect to the videoconferencing device 120 to provide a video input signal via a network. Thus, the video sources 130 are "local" in the sense of providing video input signals for possible selection for sending from the local endpoint 101 to the remote endpoints 101, but may or may not be local in the sense of physical location.

The local video input signal that is currently selected to be sent to the remote endpoints is also referred to herein as the "selected local video input signal" or simply the "selected video signal". In some embodiments, the videoconferencing device 120 may be operable to send more than one local video input signal to the remote endpoints, and thus, there may be multiple selected video signals.

As shown, the videoconferencing device 120 may be coupled to the network 105. The videoconferencing device 120 may send the selected local video input signal to the remote endpoints 101 via the network 105. The videoconferencing device 120 may also receive video signals from the remote endpoints 101 via the network 105. The video signals received from the remote endpoints 101 are also referred to herein as "remote video signals".

As used herein, the term "video signal" or "video input signal" refers to any kind of information useable to display video and does not imply that the information is in any particular form or encoded in any particular way. For example, in various embodiments, the local video signal from a local video source may be sent from an endpoint 101 to the remote endpoints 101 in any form and using any of various communication protocols or standards. In a typical embodiment, the local video signal is sent to the remote endpoints 101 as digital information, e.g., as ordered packets of information. Similarly, the remote video signals may be received over the network 105 in a digital form; e.g., as ordered packets of information.

Thus, if the local video source originally produces an analog signal, then the signal may be converted into digital information, or if the local video source originally produces a digital signal, the signal may be encoded in a different way or packetized in various ways. Thus, the video information that originates from a given video source 130 may be encoded, decoded, or converted into other forms at various stages between leaving the video source and arriving at the remote endpoints, possibly multiple times. The term "video signal" is intended to encompass the video information in all of its various forms.

Referring again to FIG. 2, the videoconferencing system 119 at the endpoint 101 also includes one or more display devices 122 to which the videoconferencing device 120 provides an output signal via an output port. The display device 122 may comprise any kind of device operable to display video information, such as a television, computer monitor, LCD screen, projector, or other device.

The videoconferencing device 120 may be operable to display the remote video signals from the remote endpoints on the display device 122. The videoconferencing device 120 may also display one or more of the local video signals on the display device 122, e.g., may display the selected local video signal. As described above, the various video signals may be displayed together with each other as a continuous presence display. For example, the videoconferencing device 120 may include hardware logic which receives the remote video signals and the selected local video signal and creates a composite image which is then provided to the display device 122, e.g., so that the various video signals are tiled or displayed in different respective windows on the display device 122.

In some embodiments the videoconferencing device 120 may be operable to display a graphical user interface (GUI) on the display device 122, where the user (operator of the videoconferencing device 120) can interact with the GUI in order to provide input to the videoconferencing device 120, e.g., similar to the manner in which users commonly provide input to on-screen television displays in order to set various options or perform various functions. For example, the user may operate the remote control device 128 or other input device, such as a keyboard or buttons on the videoconferencing device 120 chassis, in order to request the videoconferencing device 120 to perform a particular operation. In response, the videoconferencing device 120 may display various GUI elements on the display device 122, e.g., where the GUI elements indicate various options or functions related to the requested operation. The user may then scroll to and select a desired GUI element.

In some embodiments the videoconferencing system 119 may include multiple display devices 122. The videoconferencing device 120 may be configured to distribute the various video signals across the multiple display devices 122 in any of various ways.

As shown, the videoconferencing device 120 may also couple to one or more audio devices 124. For example, the audio device(s) 124 may include one or more microphones or other audio input devices for providing local audio input to be sent to the remote endpoints 101, as well as one or more speakers or other audio output devices for audibly projecting audio information received from the remote endpoints 101.

Figure 3:
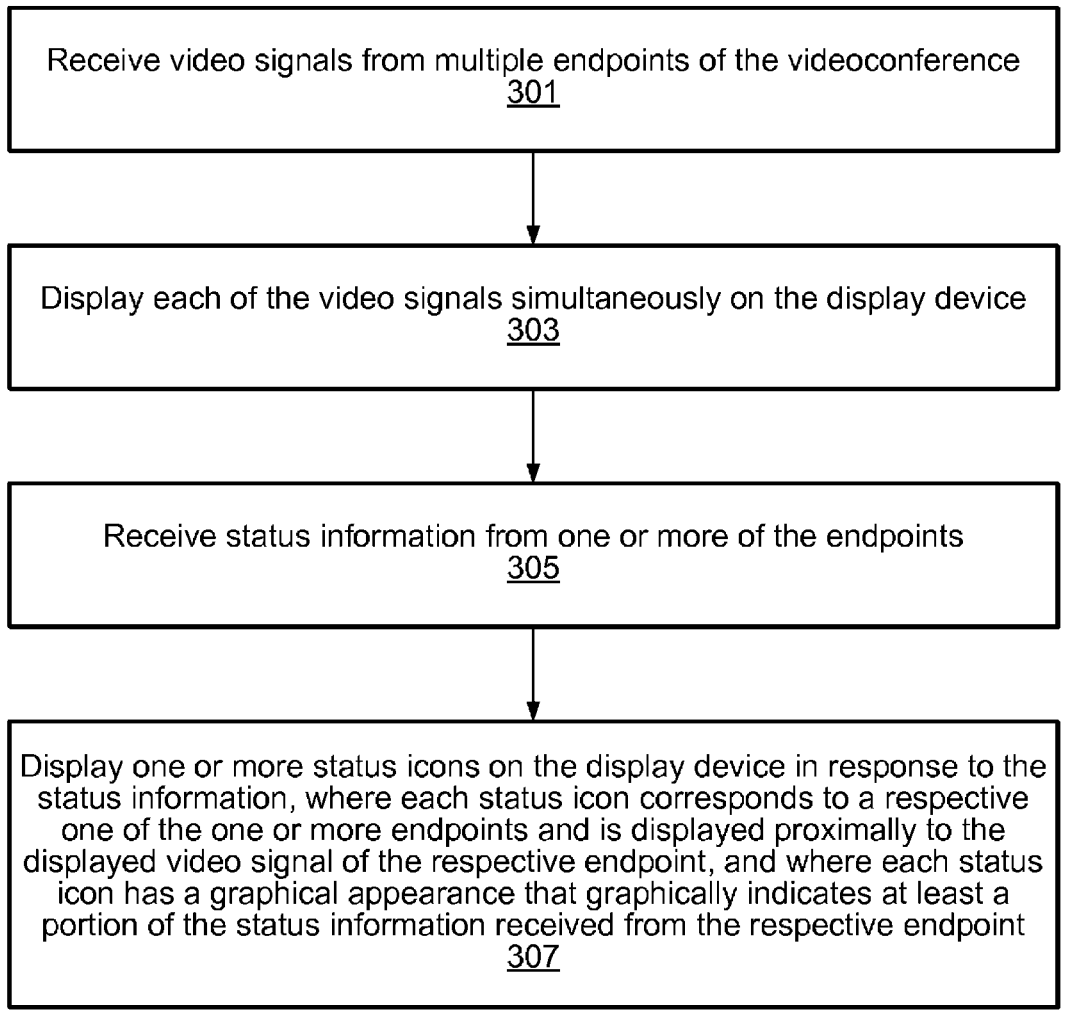
FIG. 3 is a flowchart diagram illustrating one embodiment of a method for visually indicating status information on a continuous presence display in a videoconferencing system.

Referring now to FIG. 3, a flowchart diagram is shown to illustrate one embodiment of a method for visually indicating status information on a continuous presence display in a videoconferencing system. The method of FIG. 3 may be implemented by one or more of the devices shown in the videoconferencing system 119 illustrated in FIG. 2, such as the videoconferencing device 120. It is noted that FIG. 3 represents a particular embodiment of the method, and various alternative embodiments are contemplated. Also, various elements of FIG. 3 may be combined or performed in different orders.

In 301, video signals may be received from multiple endpoints of the videoconference, e.g., may be received by a videoconferencing device 120 at a local endpoint 101. The video signals may comprise remote video signals received from remote endpoints 101 and/or one or more local video signals received from local video sources at the local endpoint 101. The received video signals preferably include at least one remote video signal received from a remote endpoint 101.

In 303, the video signals may be displayed simultaneously (displayed together with each other) on the display device 122. For example, the videoconferencing device 120 may form a composite image of the received video signals and display them together with each other as a continuous presence display, as described above.

As indicated in 305, status information may be received from one or more of the endpoints 101. In one embodiment, status information may be received from each of the endpoints. In other embodiments, status information may be received from a subset, but not all, of the endpoints. For example, some of the videoconferencing devices at remote endpoints 101 may be operable to send status information and others may not.

The status information received from a given endpoint may indicate a current state of one or more variable properties of the endpoint. In various embodiments the status information may include information regarding any of various kinds of variable properties of the endpoint. For example, in one embodiment an endpoint may be operable to mute its audio, e.g., so that audio information from that endpoint is not sent to other endpoints in the videoconference while the audio is muted. In this example, the status information from the endpoint may indicate the mute state of the endpoint, e.g., may indicate whether the audio of the endpoint is currently muted. The status information may also or may alternatively include information regarding various other audio properties of the endpoint, such as a current volume level.

The state information from a given endpoint may also or may alternatively include information regarding variable properties of the endpoint other than audio properties. For example, in some embodiments, the state information may indicate current states of one or more video properties of the endpoint. As one example, the state information may indicate a current video source at the endpoint, e.g., may indicate which video source or what kind of video source is producing the video signal received from that endpoint. As another example, the state information may indicate states of various properties of a camera at the endpoint. For example, the state information may indicate a zoom value of the camera (e.g., how much the camera is zoomed in or zoomed out), a panning value of the camera (e.g., how far the camera is panned to the left or right), a tilt value of the camera (e.g., how far the camera is tilted up or down), etc.

In various embodiments, the status information and the video signals may be received using any of various communication protocols. In some embodiments, the status information from a given endpoint may be received together with the video signal from the endpoint. In other embodiments the status information may be received separately from the video signal, e.g., as a separate communication.

Referring again to FIG. 3, in 307, one or more status icons may be displayed on the display device in response to the status information. Each status icon may correspond to a respective one of the one or more endpoints and may be displayed in such a way that the status icon is visually associated with the displayed video signal of the respective endpoint. For example, each status icon may be displayed proximally to the displayed video signal of the respective endpoint. Also, each icon preferably has a graphical appearance that graphically indicates at least a portion of the status information received from the respective endpoint. In some embodiments, multiple status icons may be displayed proximally to the displayed video signal of a given endpoint, e.g., where different status icons graphically indicate different portions or aspects of the status information received from the endpoint.

Displaying a status icon proximally to the displayed video signal of the respective endpoint to which it corresponds may comprise displaying the status icon on or near the video signal. For example, where the video signal is displayed in a window or screen portion on the continuous presence display, the status icon may be displayed in or next to the window or screen portion.

Displaying the one or more status icons proximally to the displayed video signals of the respective endpoints may visually associate the status icons with their corresponding endpoints. This may allow the participants in the video conference to easily learn the status information for the various endpoints in the videoconference simply by looking at the various status icons displayed proximally to the video signals displayed on the continuous presence display.

As used herein, the term "icon" refers to information comprising graphical or pictorial information. As noted above, each status icon preferably has a graphical appearance that graphically indicates at least a portion of the status information received from the respective endpoint. As one example, where the status information from a given endpoint indicates that audio is muted at the endpoint, a status icon may graphically indicate that the audio is muted. For example, the icon may comprise a picture of a speaker or microphone with a line crossed through it to indicate that the audio is muted. In one embodiment, a status icon may also include textual information in addition to graphical information. For example, in the above example of muted audio, the status icon may include the word "Mute" in addition to the graphical information.

In the preferred embodiment, each status icon has a small size, e.g., takes up only a small portion of the display screen. For example, each status icon may be substantially smaller than the video signal with which it is associated. Displaying the status icons at a small size may enable the status information to be visually presented without distracting viewers from the video signals displayed on the continuous presence display.

Figure 4:
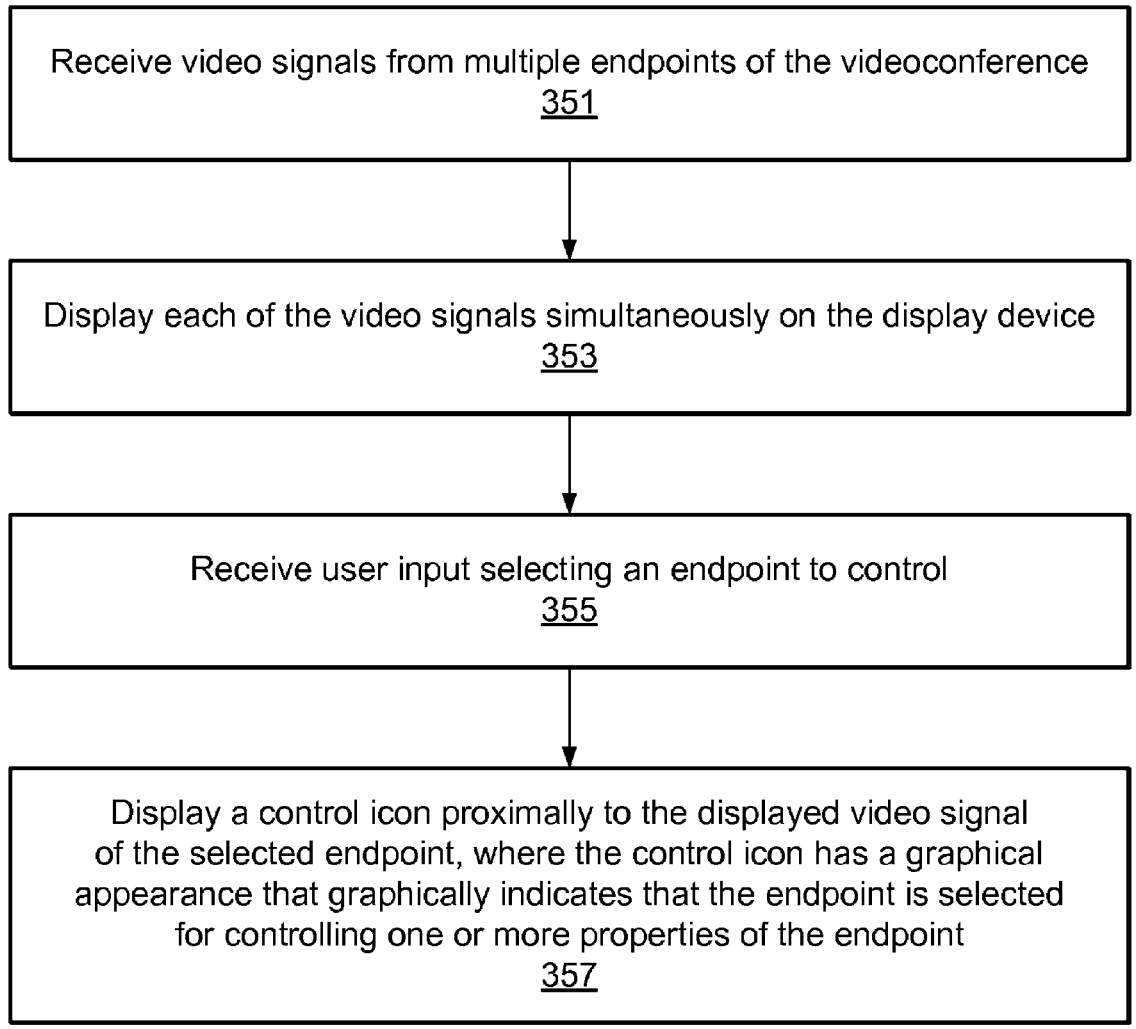
FIG. 4 is a flowchart diagram illustrating one embodiment of a method for visually indicating control of an endpoint in a videoconference.

Referring now to FIG. 4, a flowchart diagram is shown to illustrate one embodiment of a method for visually indicating control of an endpoint in a videoconference. The method of FIG. 4 may be implemented by one or more of the devices shown in the videoconferencing system 119 illustrated in FIG. 2, such as the videoconferencing device 120. It is noted that FIG. 4 represents a particular embodiment of the method, and various alternative embodiments are contemplated. Also, various elements of FIG. 4 may be combined or performed in different orders.

In 351, video signals may be received from multiple endpoints of the videoconference, e.g., may be received by a videoconferencing device 120 at a local endpoint 101, similarly as described above with reference to 301 of FIG. 3.

In 351, the video signals may be displayed simultaneously on a display device 122, e.g., to form a continuous presence display, similarly as described above with reference to 303 of FIG. 3.

In 355, user input selecting an endpoint to control may be received. For example, a user (e.g., operator of the videoconferencing device 120) may desire to control one or more properties of a particular endpoint. The videoconferencing device 120 may enable the user to select the endpoint using any of various techniques, such as by operating a remote control device 128, a keyboard, buttons located on the videoconferencing device 120 chassis, or any of various other kinds of input devices.

In various embodiments, the user may select the endpoint in order to control any of various kinds of properties of the endpoint. For example, the endpoint may be selected in order to control various properties of a camera at the endpoint, such as panning, tilting, zooming, etc. As another example, the endpoint may be selected in order to select a video source for the endpoint, e.g., in order to control which video signal from the endpoint is sent to other endpoints in the videoconference. As another example, the endpoint may be selected in order to control various audio properties for the endpoint, such as a volume level or mute state.

In response to the user selecting the endpoint to control, the videoconferencing device 120 may display a control icon proximally to the displayed video signal of the selected endpoint. The control icon may have a graphical appearance that graphically indicates that the endpoint is selected for controlling the one or more properties of the endpoint. The control icon displayed proximally to the video signal of the selected endpoint may serve as a visual indicator to the operator of the videoconferencing device that that particular endpoint is currently selected for control.

Figure 5A:
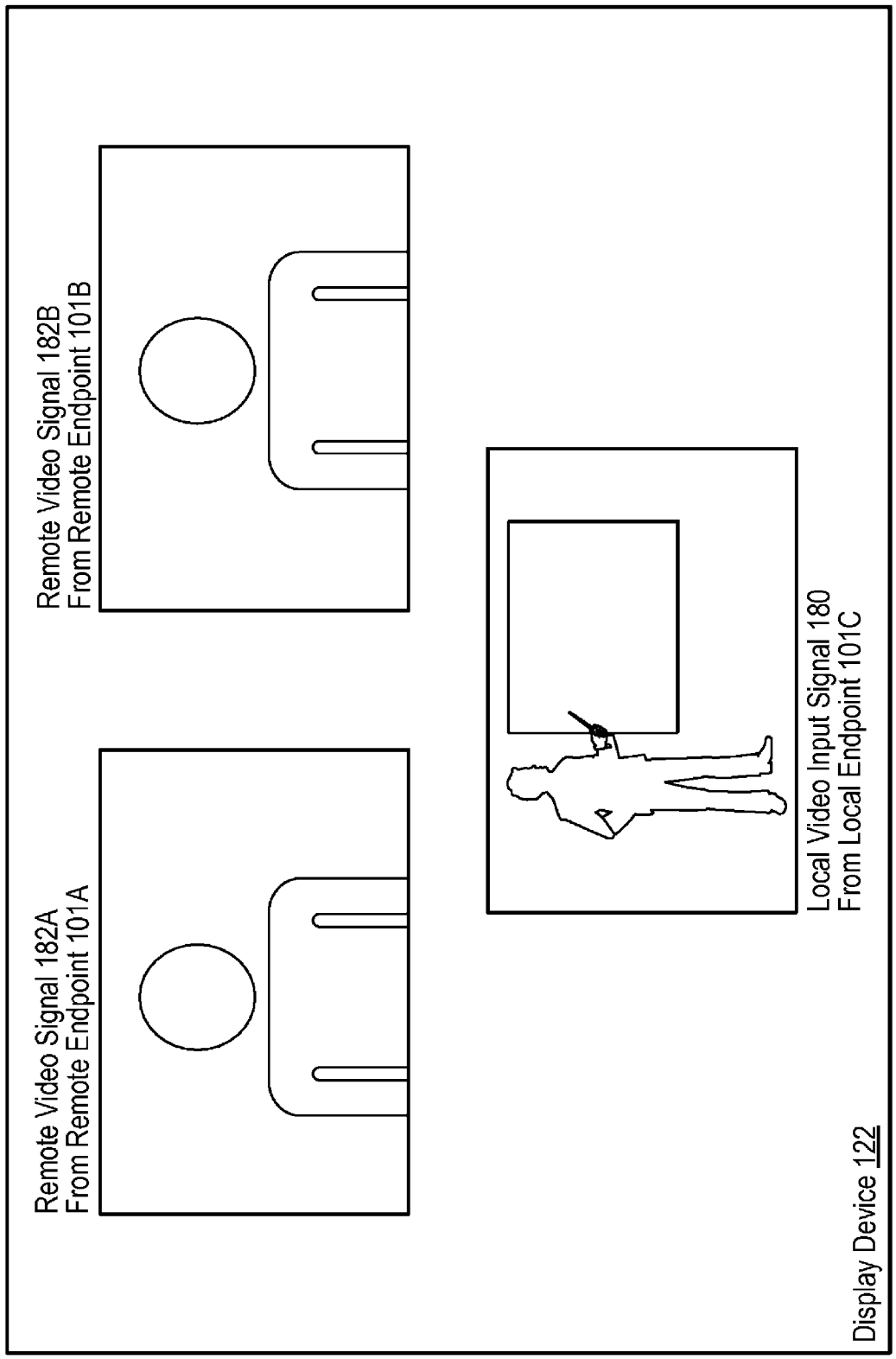
FIGS. 5A-5B illustrate examples of a continuous presence display.

FIG. 5A illustrates one simple example of a continuous presence display, e.g., where the continuous presence display is shown on a display device 122 at a particular endpoint 101 in a videoconference, referred to as the local endpoint. In this example, the local endpoint 101C participates in the videoconference with two remote endpoints, 101A and 101B. In this example, the currently selected local video input signal 180 from the local endpoint 101C is displayed in a first window on the display device 122, the remote video signal 182A from the remote endpoint 101A is displayed in a second window, and the remote video signal 182B from the remote endpoint 101B is displayed in a third window.

Figure 5B:
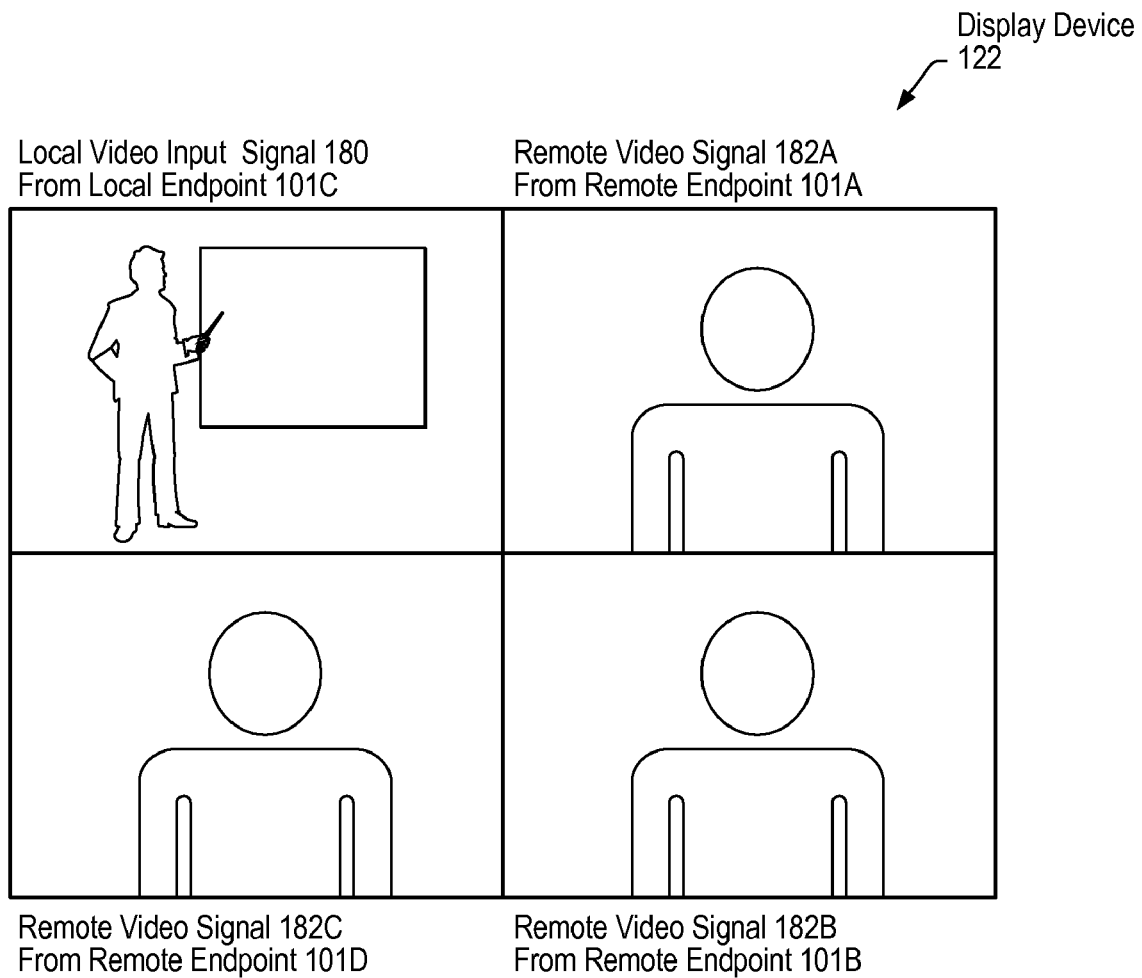

FIG. 5B illustrates another example of a continuous presence display. In this example, the local endpoint 101C participates in the videoconference with three remote endpoints, 101A, 101B, and 101D, and the video signals from the four endpoints are tiled so that they fill the display screen of the display device 122.

FIGS. 6A-6F illustrate the continuous presence display of FIG. 5A, where various examples of status and/or control icons are displayed on the continuous presence display. For example, in FIG. 6A, a status icon 500 is superimposed on the remote video signal 182 from remote endpoint 101A. In this example, the status information received from the remote endpoint 101A indicates a mute state of the remote endpoint 101A, and the status icon graphically indicates the mute state. In this example, the status icon appears as a microphone with a diagonal line drawn through it, indicating that the audio at remote endpoint 101A is currently muted. If the audio at remote endpoint 101A is later un-muted then the status icon may be removed from the display. In one embodiment, the status icon may be replaced with another status icon to indicate that the audio is now un-muted. In another embodiment, a status icon for the mute state may only be displayed if the audio is muted.

Figure 6A:
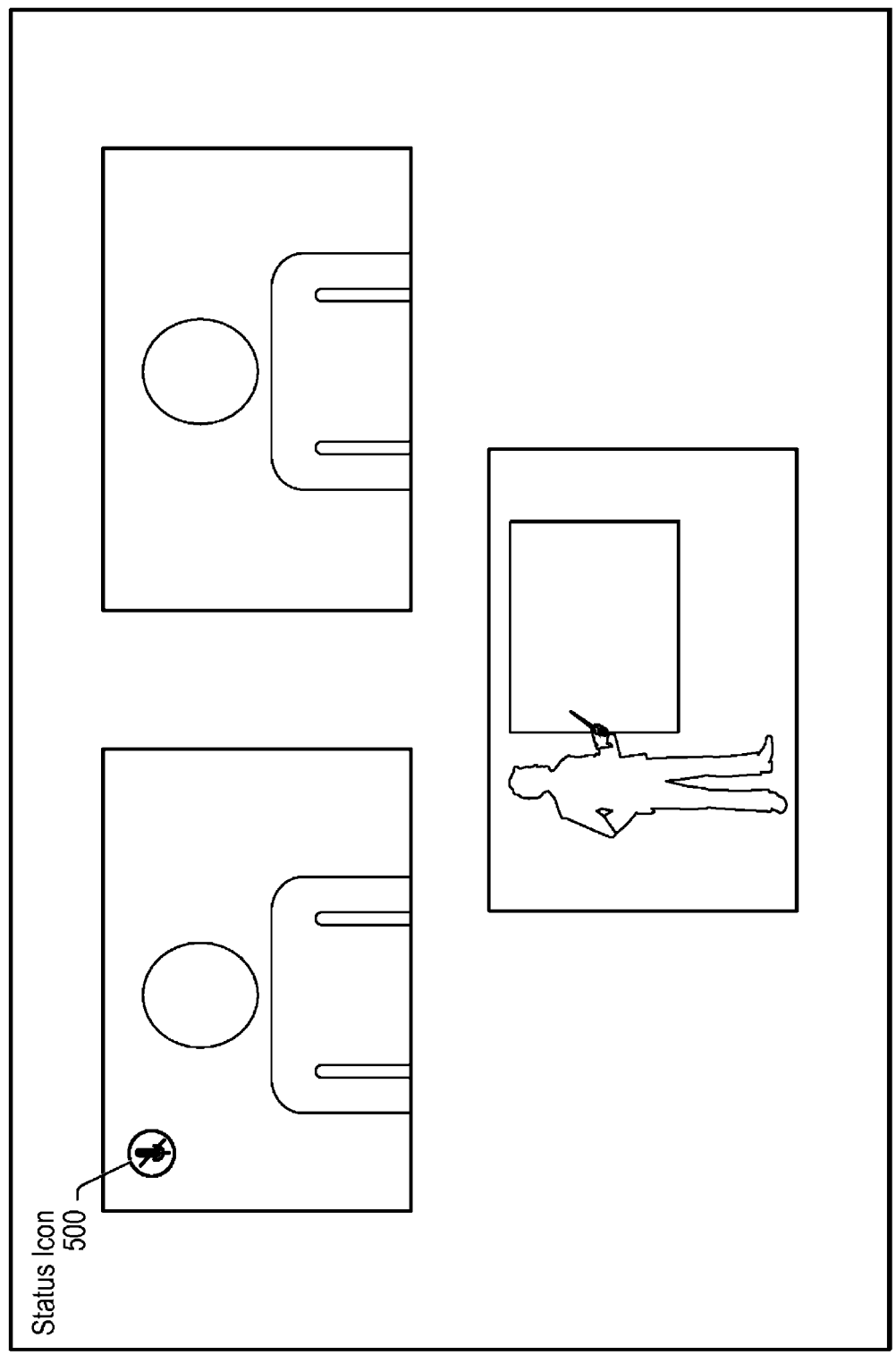
FIGS. 6A-6F illustrate the continuous presence display of FIG. 5A, where various examples of status and/or control icons are displayed on the continuous presence display.
Figure 6B:
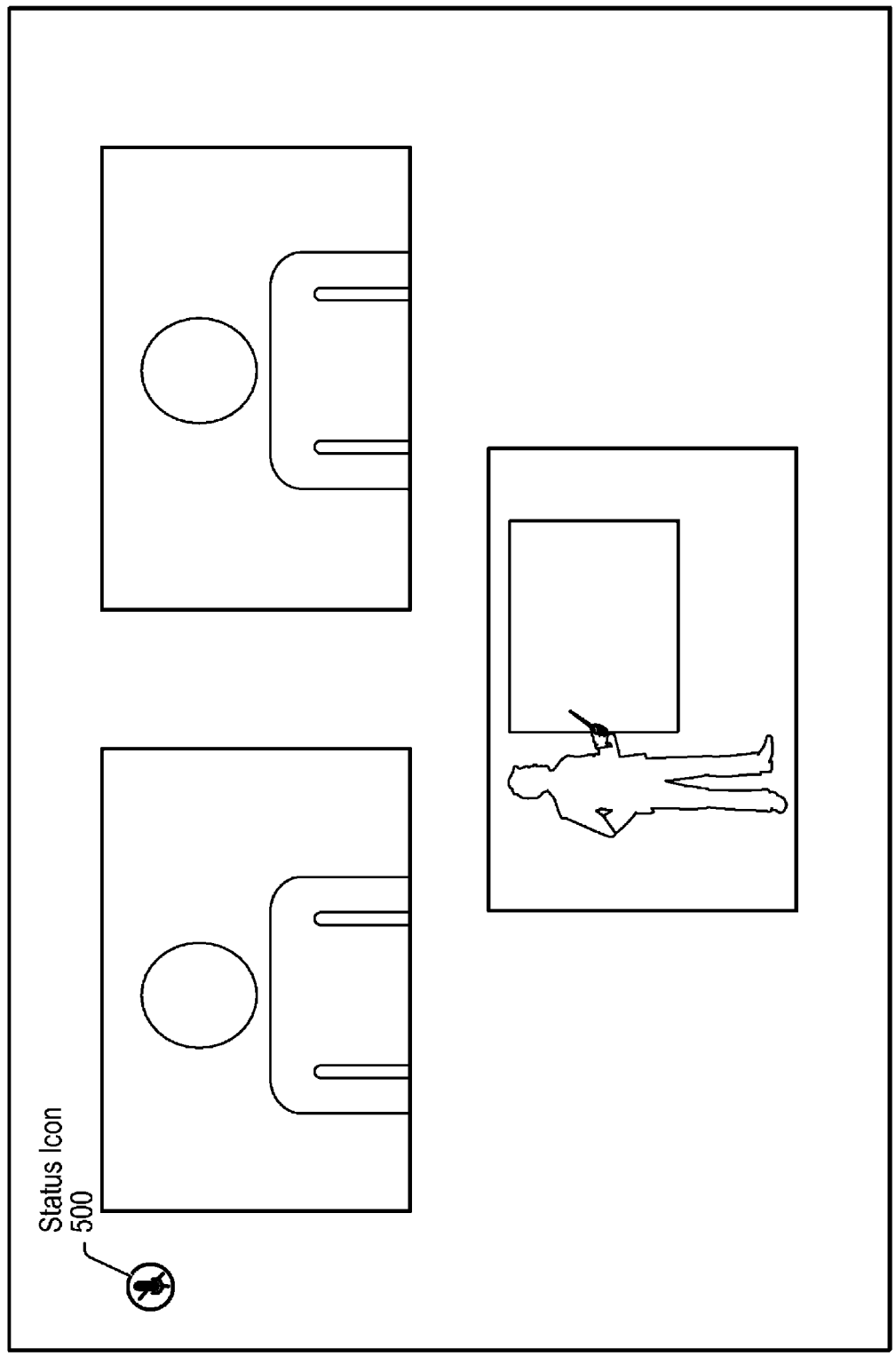

FIG. 6B is similar to FIG. 6A, but in this example, the status icon 500 is placed next to the video signal 182A from the remote endpoint 101A, without being superimposed over the video signal 182A.

Figure 6C:
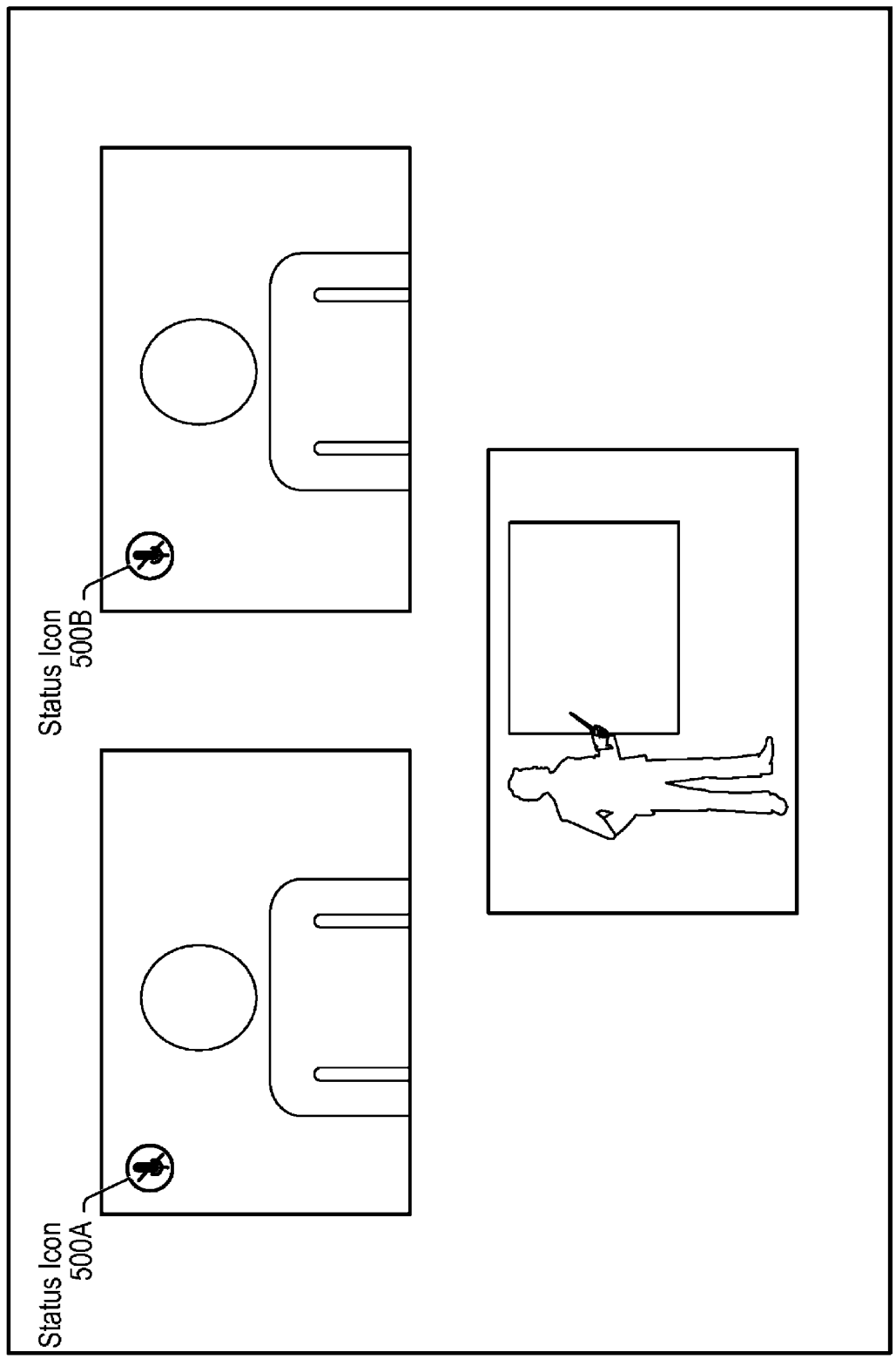

FIG. 6C is similar to FIG. 6A, where a mute status icon 500A is displayed on the video signal 182A from the remote endpoint 101A, and a mute status icon 500B is displayed on the video signal 182B from the remote endpoint 101B. The mute status icon 500A provides a visual indication that the audio from remote endpoint 101A is currently muted, and the mute status icon 500B provides a visual indication that the audio from remote endpoint 101B is currently muted.

Figure 6D:
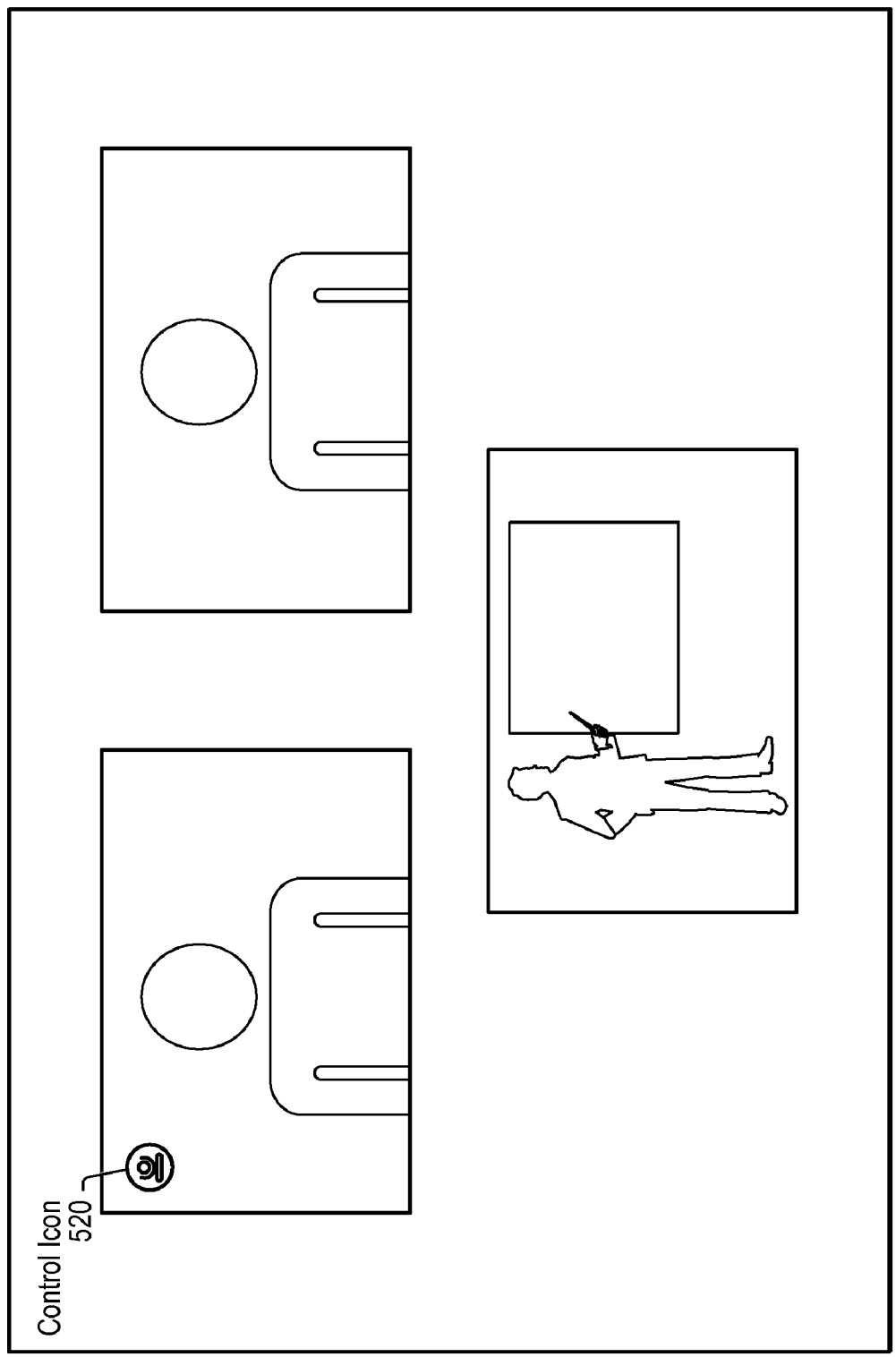

In FIG. 6D, a control icon 520 is superimposed on the remote video signal 182 from remote endpoint 101A. In this example, the control icon 520 visually indicates that the remote endpoint 101A is currently selected for controlling one or more of its video properties.

Figure 6E:
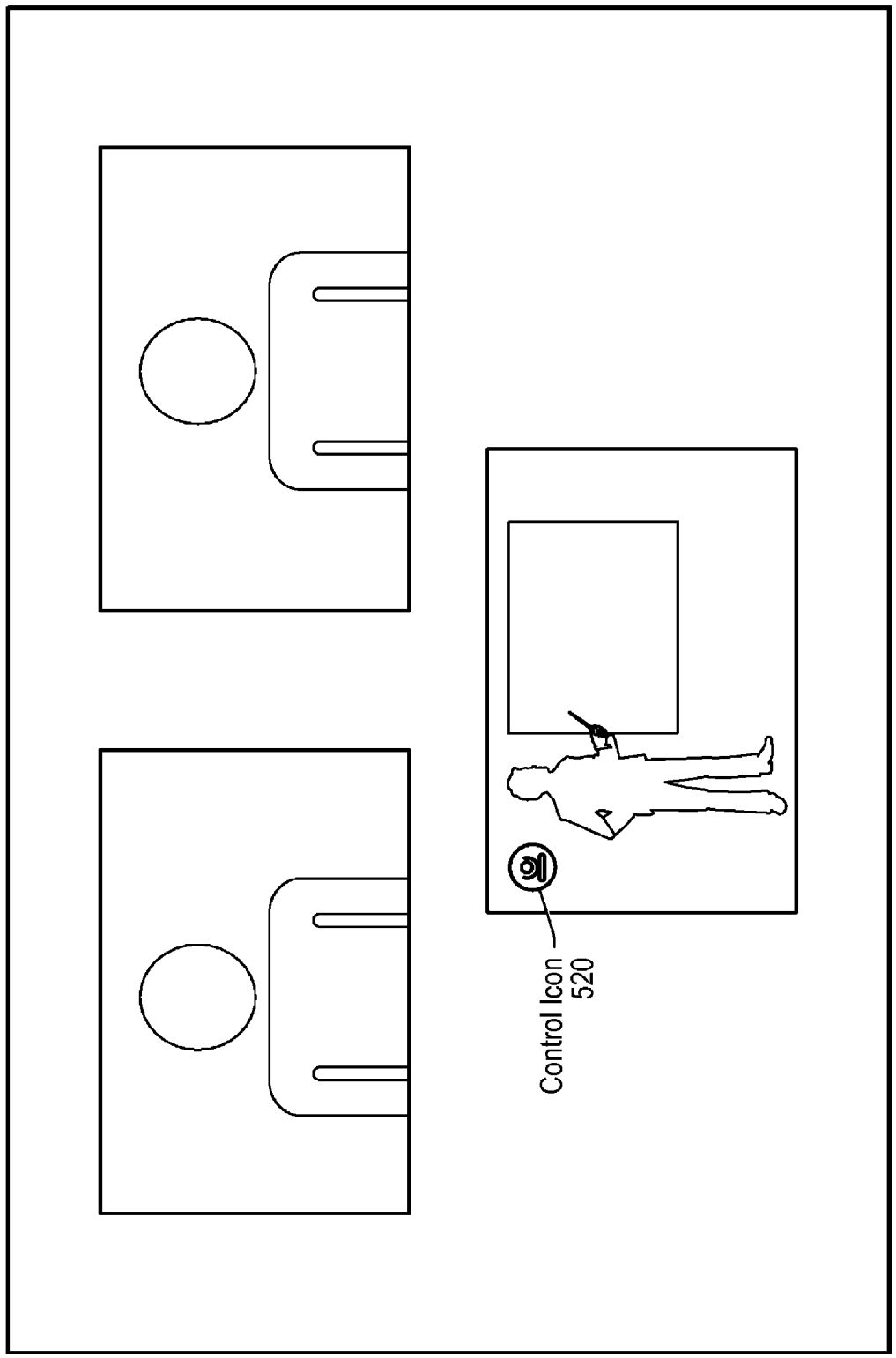

In FIG. 6E, a control icon 520 is superimposed on the local video signal 180 from local endpoint 101C. In this example, the control icon 520 visually indicates that the local endpoint 101C is currently selected for controlling one or more of its video properties. In one embodiment, only one of the endpoints 101 at a time may be selected for control of its respective video properties. Thus, the videoconferencing device 120 may move the control icon 520 to different places on the display screen according to which endpoint 101 is currently selected for control.

Figure 6F:
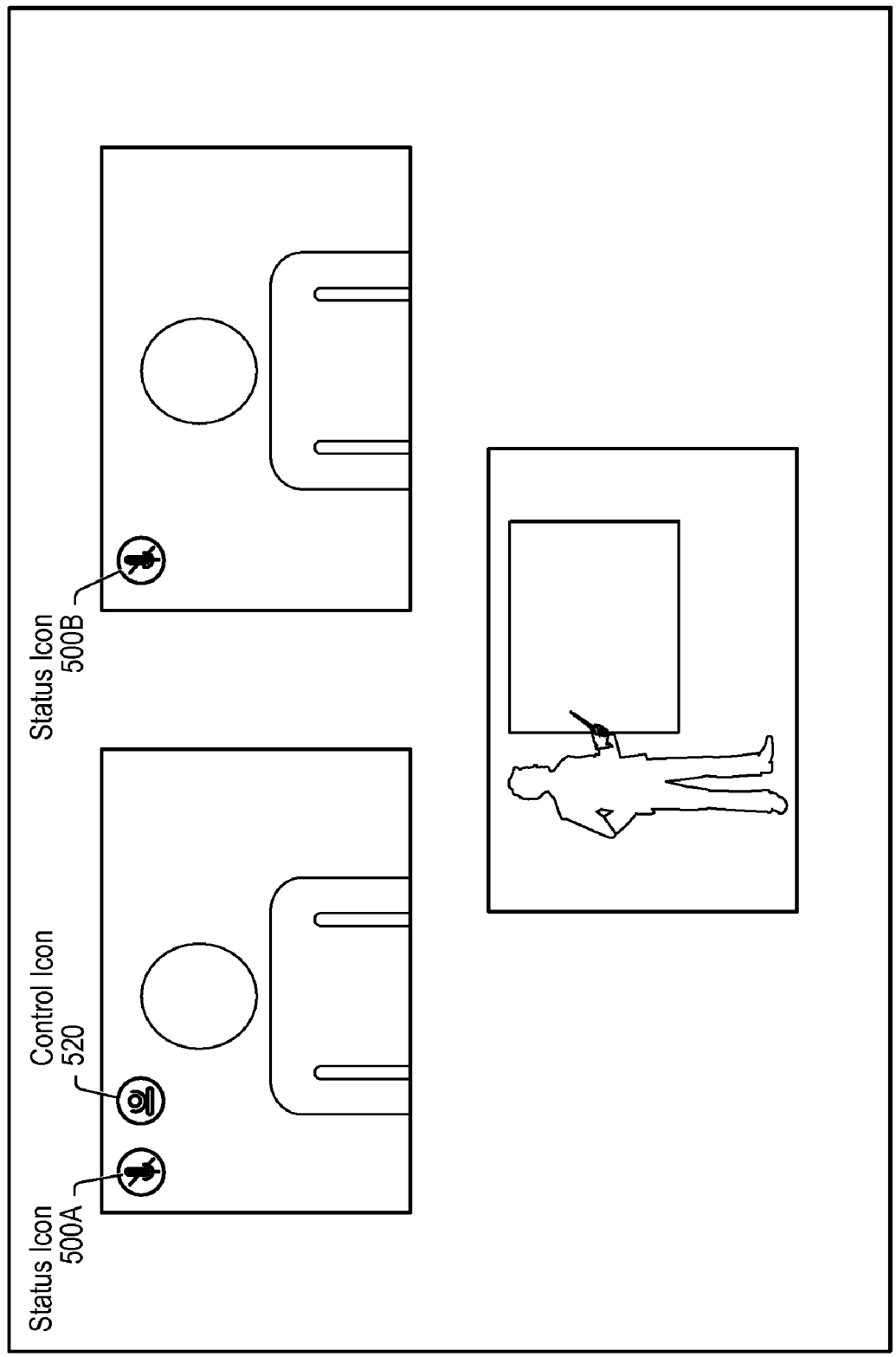

It is noted that in some embodiments the videoconferencing device 120 may be operable to display both status icons and control icons. For example, FIG. 6F illustrates an example in which two status icons 500A and 500B are displayed, and a control icon 520 is also displayed.

Figure 7A:
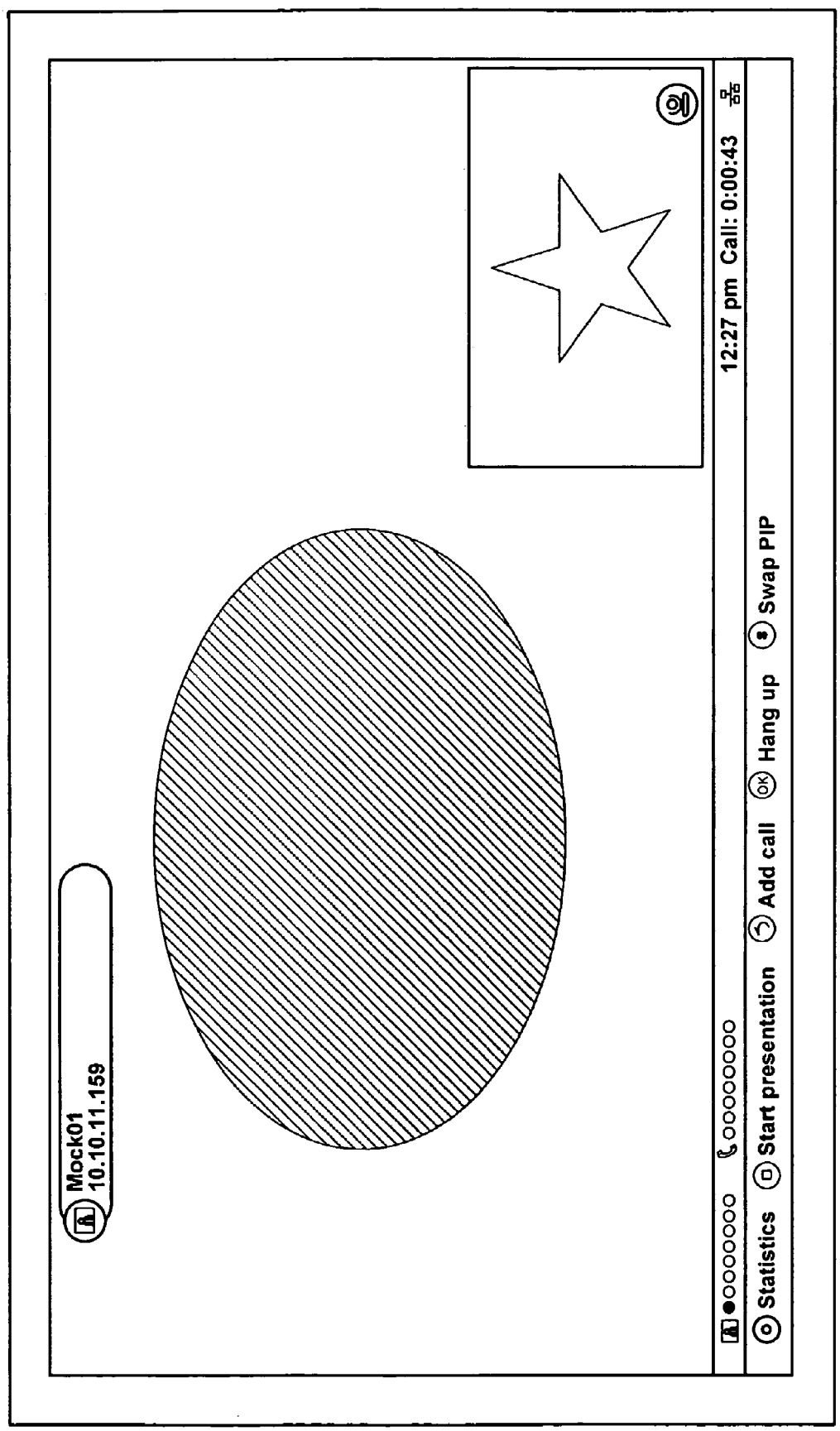
FIGS. 7A-7G illustrate more detailed examples of screen displays illustrating the use of status and control icons according to one embodiment.

FIGS. 7A-7G illustrate more detailed examples of screen displays illustrating the use of status and control icons according to one embodiment. FIG. 7A illustrates the display screen of a display device 122 at a local endpoint 101 which has established a videoconference with one remote endpoint 101. The video signals from the remote endpoint 101 is displayed such that it occupies most of the screen, and the currently selected local video signal is superimposed over the remote video signal in the small window positioned at the bottom right of the screen. (In this example, a basic shape is shown as the video signal displayed in each window, simply to illustrate the example. For example, an ellipse is shown as the remote video signal, and a star is shown as the local video signal. In a more realistic example, each video signal would of course illustrate other information, such as a person at each endpoint.)

The display screen also indicates other information regarding the remote endpoint, such as a name of the remote endpoint ("Mock01") and an IP address of the remote endpoint ("10.10.11.159").

In this example, a control icon is shown in the window of the local video signal, which indicates that the local endpoint is currently selected for controlling its video properties.

Figure 7B:
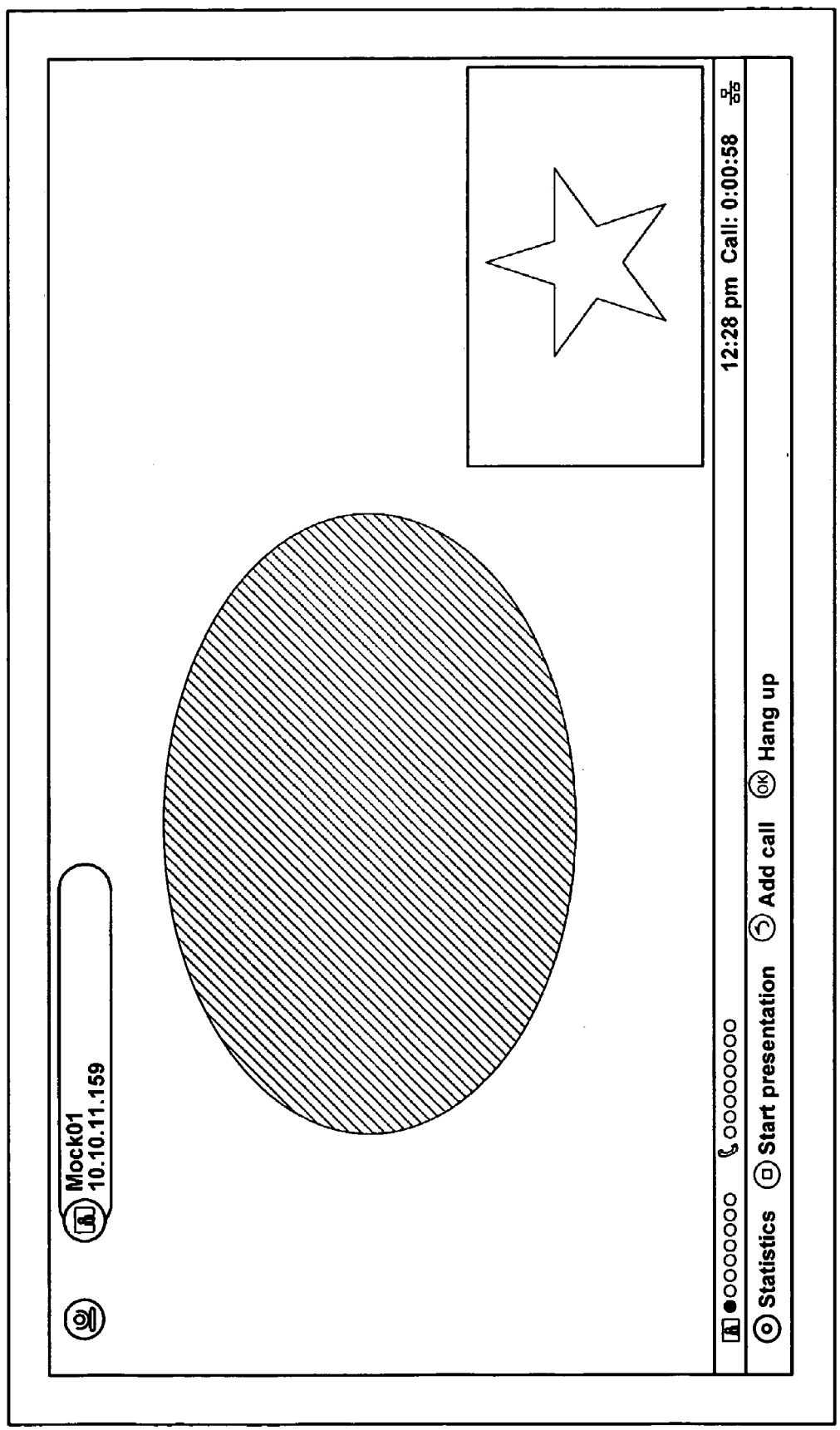

FIG. 7B illustrates the display screen of FIG. 7A after the user has selected the remote endpoint for controlling its video properties instead of the local endpoint. As shown, the control icon has been removed from the window of the local video signal and re-displayed proximally to the remote video signal.

Figure 7C:
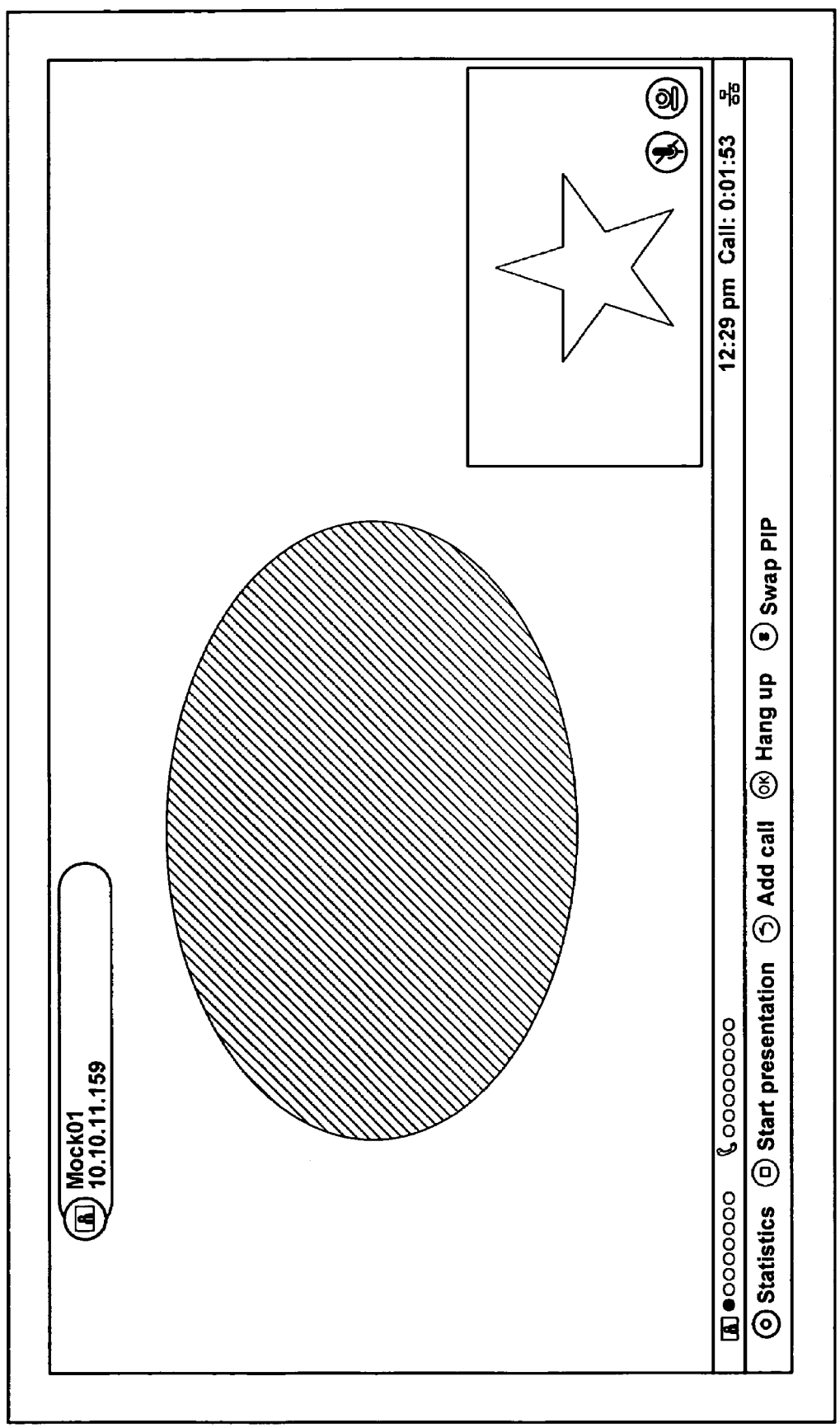

In FIG. 7C, a mute icon is shown in the window of the local video signal, which indicates that audio at the local endpoint is currently muted. A control icon is also shown in the same window.

Figure 7D:
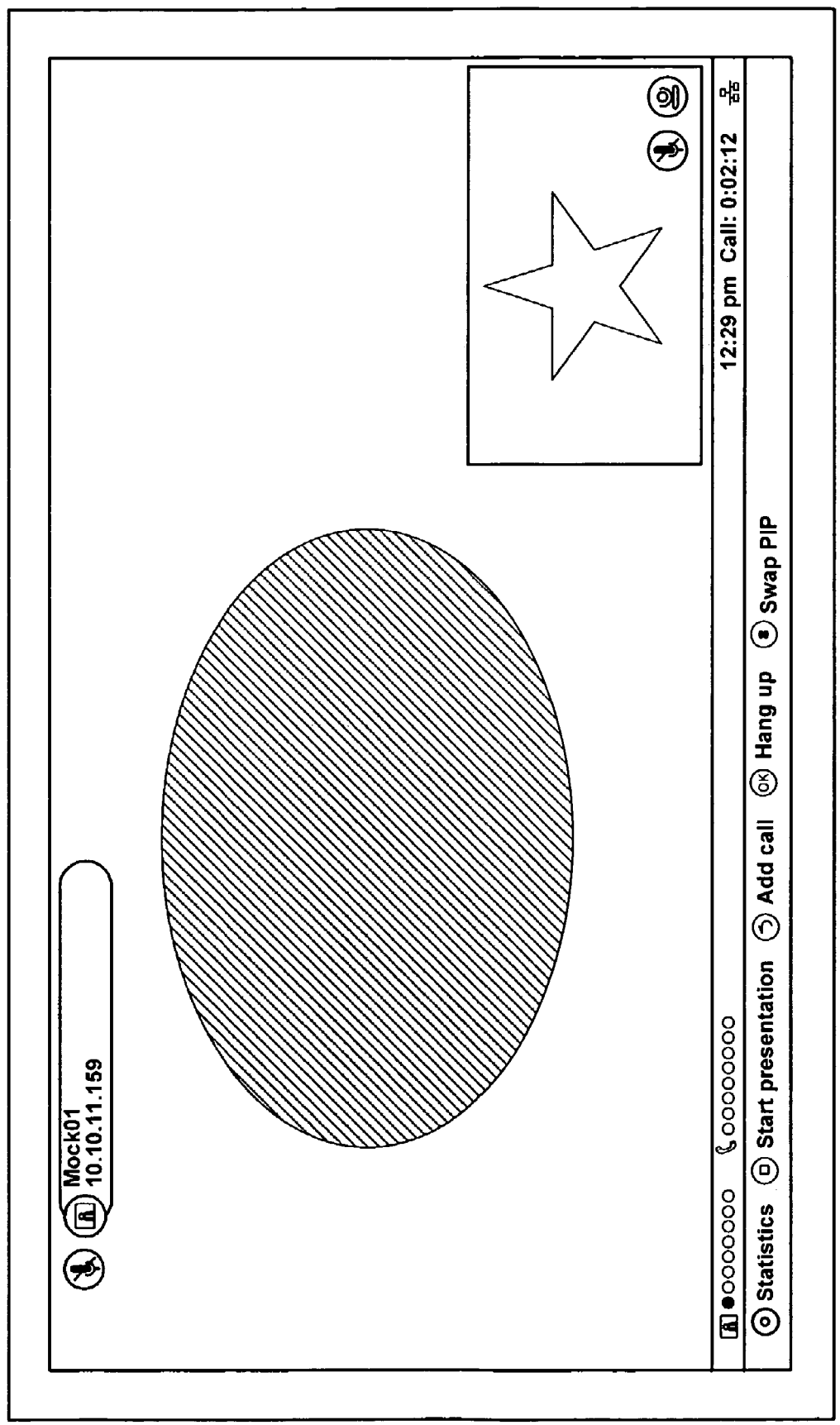

FIG. 7D is similar to FIG. 7C, where a mute icon is also shown proximally to the remote video signal, which indicates that audio at the remote endpoint is also currently muted.

Figure 7E:
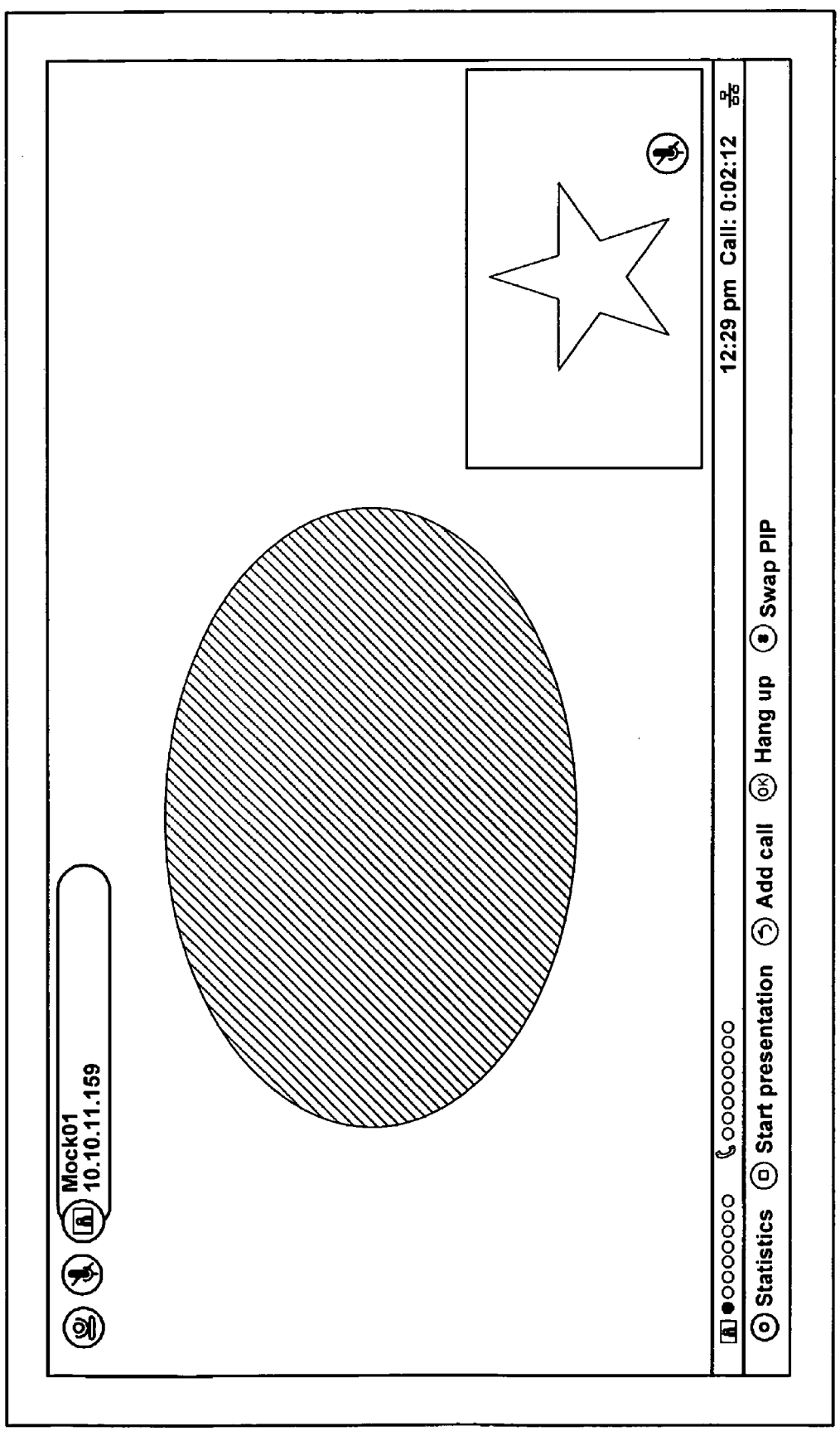

FIG. 7E is similar to FIG. 7D, but the control icon has been moved to be proximal to the remote video signal in order to visually indicate that the remote endpoint is now selected for control of video properties at the remote endpoint.

Figure 7F:
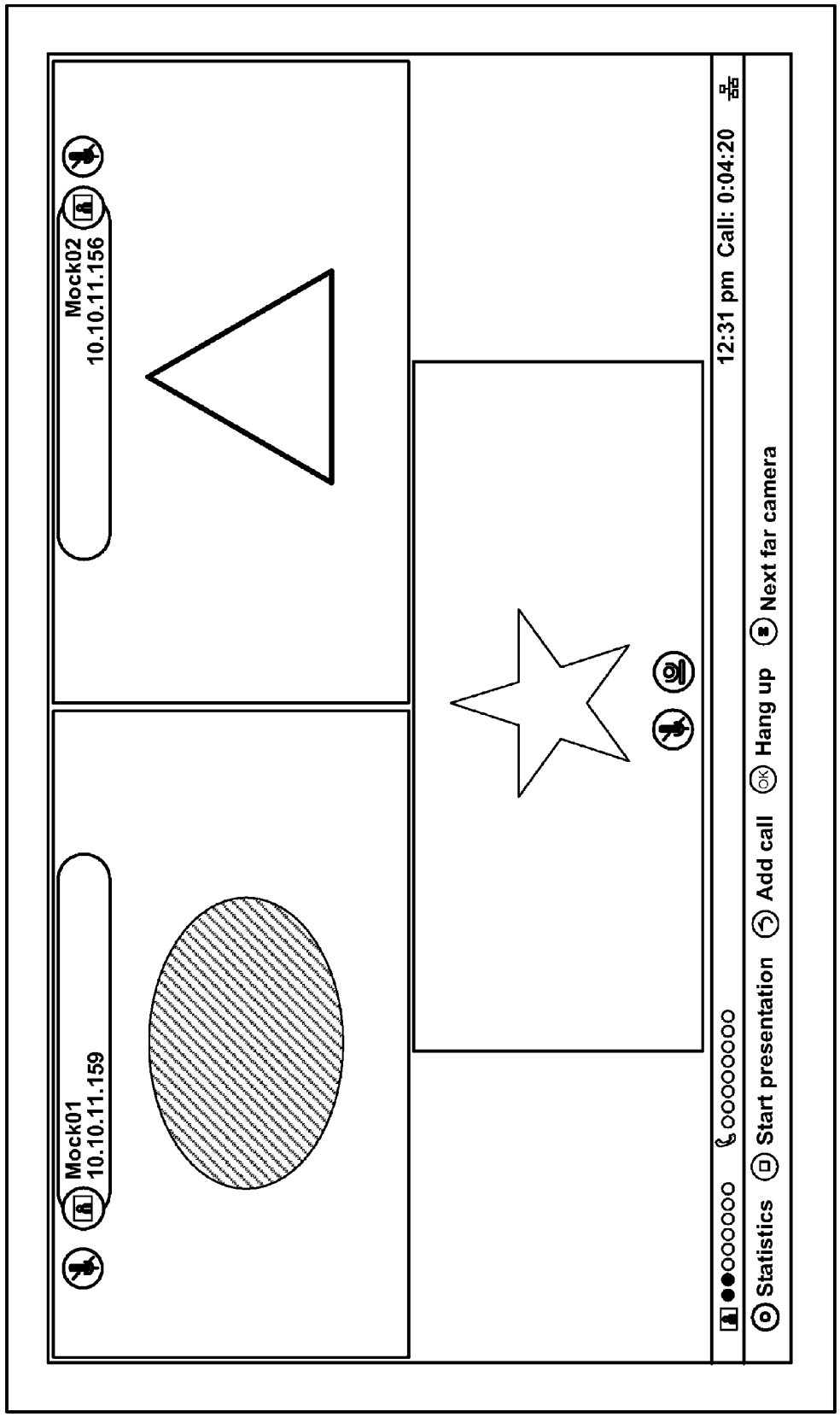

In FIG. 7F, a second remote endpoint has been added to the videoconference and the second remote video signal has been displayed along with the other two video signals. In this example, mute status icons are shown proximally to all three video signals, which indicates that audio is muted at all three endpoints. A control icon is shown proximally to the local video signal.

Figure 7G:
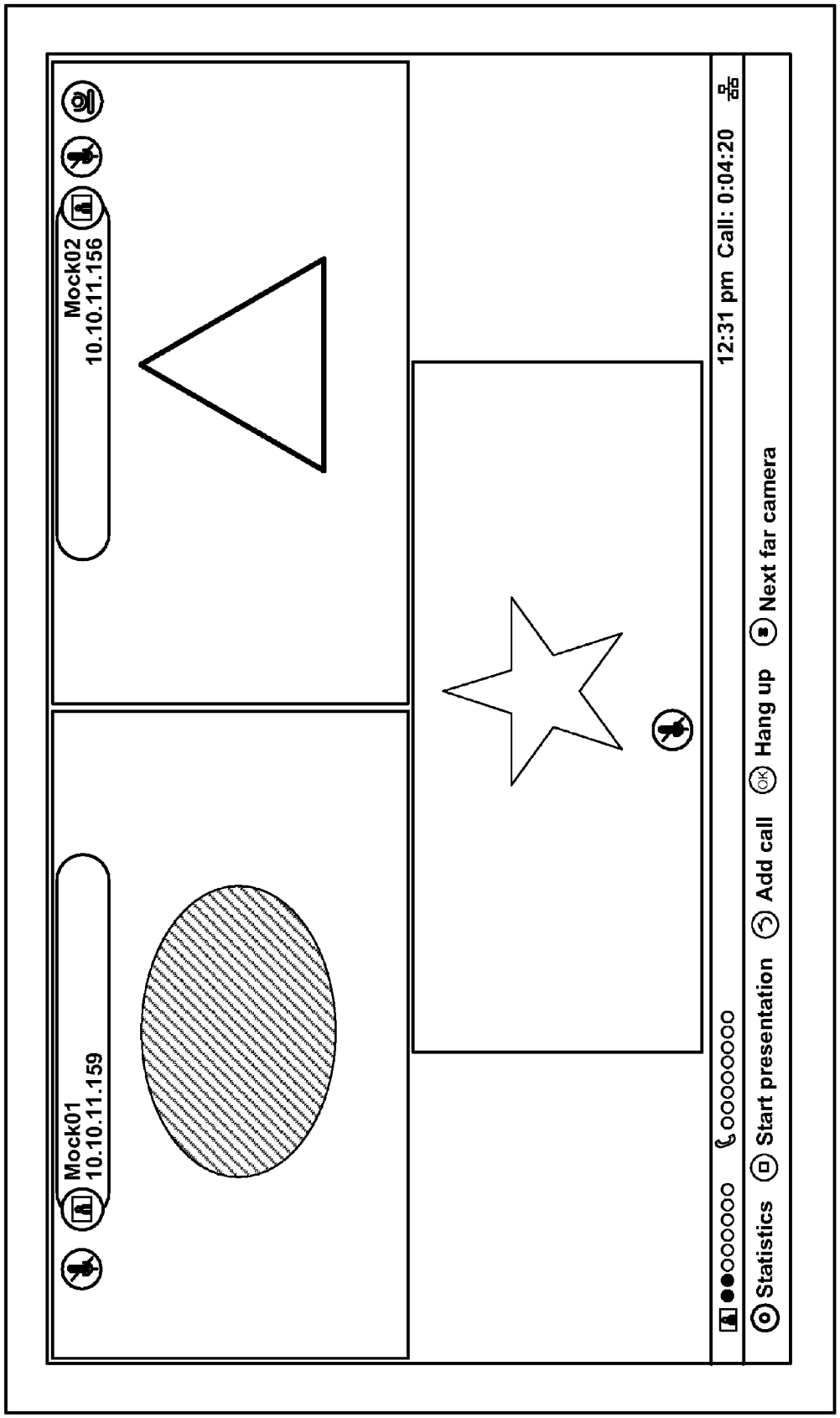

FIG. 7G is similar to FIG. 7F, but the control icon has been moved to be proximal to the remote video signal displayed in the upper right window in order to visually indicate that the respective remote endpoint is now selected for control of its video properties.

Figure 8:
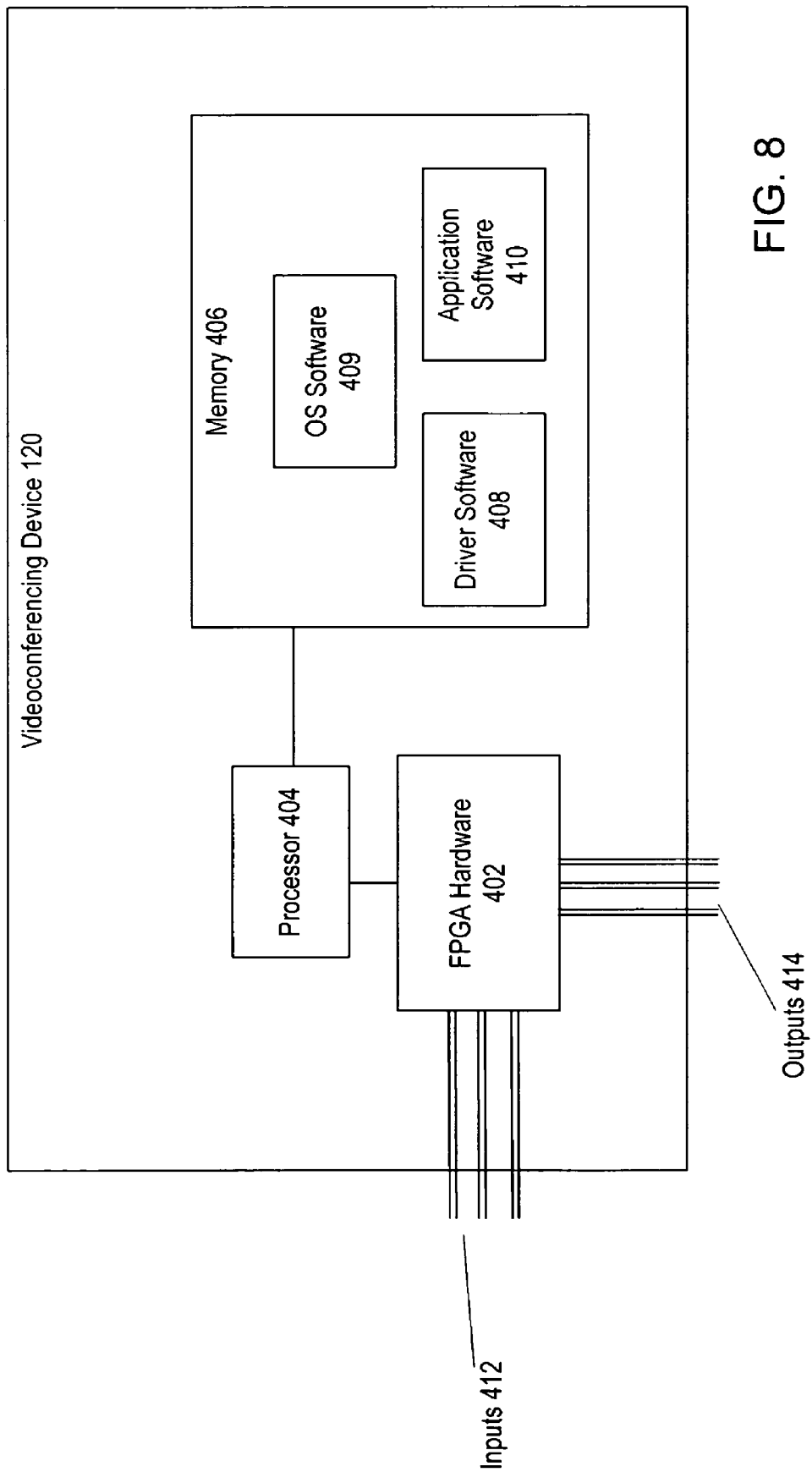
FIG. 8 illustrates an exemplary videoconferencing device according to one embodiment.

In various embodiments, the methods of FIGS. 3 and 4 may be implemented by any of various kinds of videoconferencing devices. FIG. 8 illustrates an exemplary videoconferencing device 120 according to one embodiment. It is noted that other embodiments of videoconferencing devices 120 may include any of various other kinds of components and may operate in various other ways in order to achieve the functionality described above, and that FIG. 8 represents an exemplary embodiment only.

The videoconferencing device 120 of FIG. 8 includes hardware logic for receiving input video streams (e.g., remote video signals and local video signals) from inputs 412 and creating output video streams (e.g., composite images) which are sent to outputs 414. In this example, the hardware logic comprises FPGA hardware 402, e.g., one or more FPGA chips. Operation of the FPGA hardware 402 is described below.

The videoconferencing device 120 also includes a processor 404 coupled to a memory 406. The memory 406 may be configured to store program instructions and/or data: In particular, the memory 406 may store operating system (OS) software 409, driver software 408, and application software 410. In one embodiment, the memory 406 may include one or more forms of random access memory (RAM) such as dynamic RAM (DRAM) or synchronous DRAM (SDRAM). However, in other embodiments, the memory 406 may include any other type of memory instead or in addition.

It is noted that the processor 404 is representative of any type of processor. For example, in one embodiment, the processor 404 may be compatible with the x86 architecture, while in another embodiment the processor 404 may be compatible with the SPARC™ family of processors. Also, in one embodiment the videoconferencing device 120 may include multiple processors 404.

The processor 404 may be configured to execute the software and to operate on data stored within the memory 406. The application software 410 may interface with the driver software 408 in order to communicate with or control the FPGA hardware 402 in various ways.

In particular, the application software 410 may communicate with the FPGA hardware 402 via the driver software 408 in order to control how the FPGA hardware 402 creates the composite image from the local and remote video signals. For example, suppose that in a videoconference between the local endpoint 101 and a remote endpoint 101, the videoconferencing device 120 displays a composite image of a local video signal and a remote video signal, where the two video signals are displayed in different windows on the display device. The application software 410 may control where to display the windows on the display device in relation to each other, how large to make each window, etc.

The application software 410 may also cause the display of a graphical user interface (GUI), e.g., where various GUI elements are superimposed over the displayed video signals in the composite image. For example, the GUI may comprise GUI elements for receiving user input and/or GUI elements for displaying information to the user. In particular, the application software 410 may cause status and/or control icons to be displayed on the display screen, as described above.

Figure 9A:
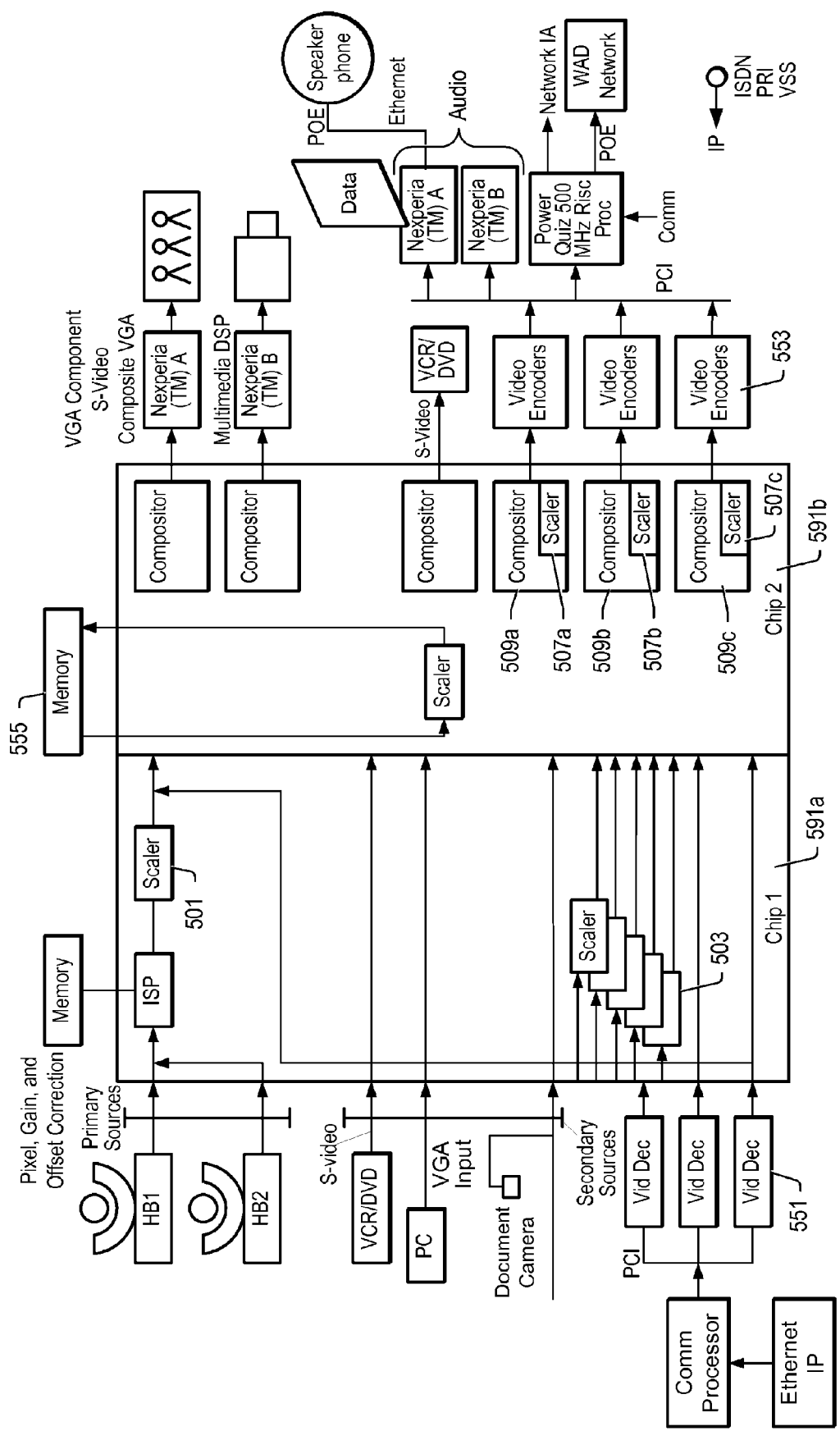
FIGS. 9A-9D illustrate exemplary hardware components of the videoconferencing device of FIG. 8, according to one embodiment.
Figure 9B:
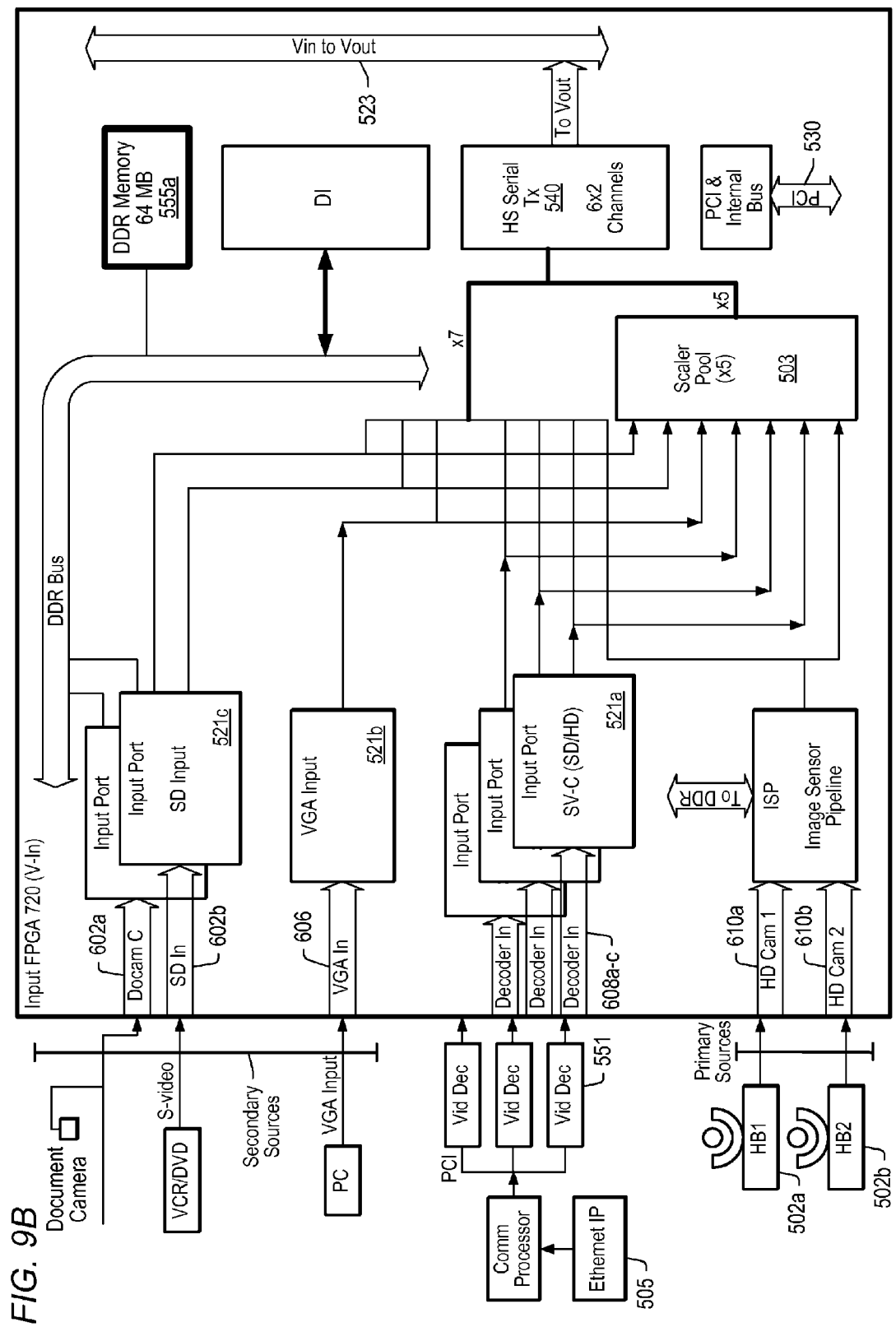
Figure 9C:
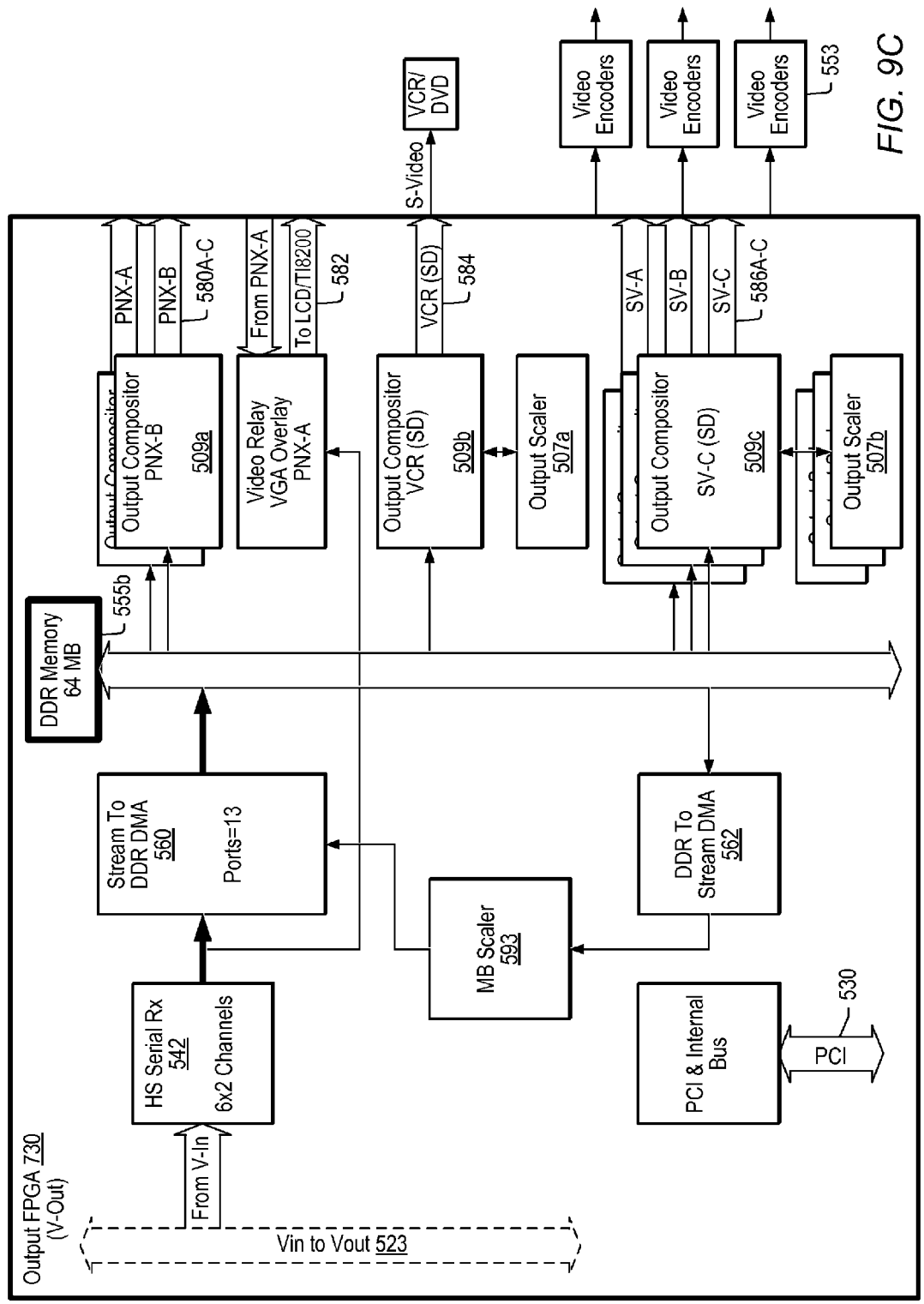

Referring now to FIGS. 9A-9C, exemplary embodiments of the FPGA hardware 402 are illustrated. In one embodiment the FPGA hardware 402 includes two FPGA chips, referred to as input FPGA 720 (also referred to as the "V-In" chip) and output FPGA 730 (also referred to as the "V-Out" chip). FIG. 9A provides a high-level overview of components of the FPGA hardware 402.

FIG. 9B illustrates components of the input FPGA 720 in greater detail. Inputs 602, 606, 608, and 610 receive video input signals from various sources. For example, inputs 602A and 602B receive S-video input signals from local S-video sources, such as a document camera and a VCR or DVD player. Input 606 receives a VGA input signal from a device such as a PC. Inputs 610 are primary camera inputs that receive input signals from local cameras HB1 and HB2. For example, these cameras may provide video of the participants at the local endpoint. In one embodiment, these are high definition cameras. The input FPGA 720 may also interface with the video decoders 551. The video decoders 551 may receive remote video signals, e.g., over a network, and decode the remote video signals for input to the FPGA 720. The various video input signals are also referred to herein as "input streams".

As shown, the input FPGA 720 includes a pool of scalers 503. One or more of the input streams may be sent to the scalers 503 in order to change its resolution, e.g., to scale the resolution up or down. As one example, in one embodiment the S-video input streams may be scaled up to a higher resolution, e.g., so that they can be displayed at a larger size on the display screen. As another example, the HB1 and HB2 primary camera input streams, which may be high definition video, may be scaled down by the scalers 502, e.g., in order to be sent to an S-video output (e.g., for output to a VCR).

After possibly being scaled up or down, the input streams may be serialized by the HS Serial TX module 540 and sent to the output FPGA 730.

FIG. 9C illustrates components of the output FPGA 730 in greater detail. The input streams coming from the input FPGA may be de-serialized by the HS Serial RX module 542 and then written into DDR memory 555b by the Stream-to-DDR DMA module 560.

In the illustrated embodiment, the output FPGA 730 includes a memory-based (MB) scaler 593, which is operable to scale down the input streams for display as thumbnail images in the composite image. The DDR-to-Stream DMA module 562 may read the input streams from DDR memory 555b and feed them to the MB scaler 593. The MB scaler 593 may scale down the input streams to a low resolution for display as thumbnail images, e.g., where the thumbnail images are displayed at a relatively small size with respect to the size of the display device screen.

The MB scaler 593 provides the scaled-down input streams to the DDR-to-Stream DMA module 562. Each of the scaled-down input streams may be written by the DDR-to-Stream DMA module 562 to a different location in the DDR memory 555b than the original input stream.

One or more composite images may be created from the input streams received from the input FPGA 720 and/or from the scaled-down input streams created by the MB scaler 593. For example, the output FPGA 730 may be operable to provide composite images on various outputs, such as the outputs 580, 582, 584, and 586. Each output may be coupled to a respective compositor 509, which receives one or more of the input streams from the DDR memory 555b and creates a composite image suitable for the output type. For example, the compositor 509b may provide a composite image at S-video resolution on output 584 to an S-video output device, such as a DVD player or VCR.

Figure 9D:
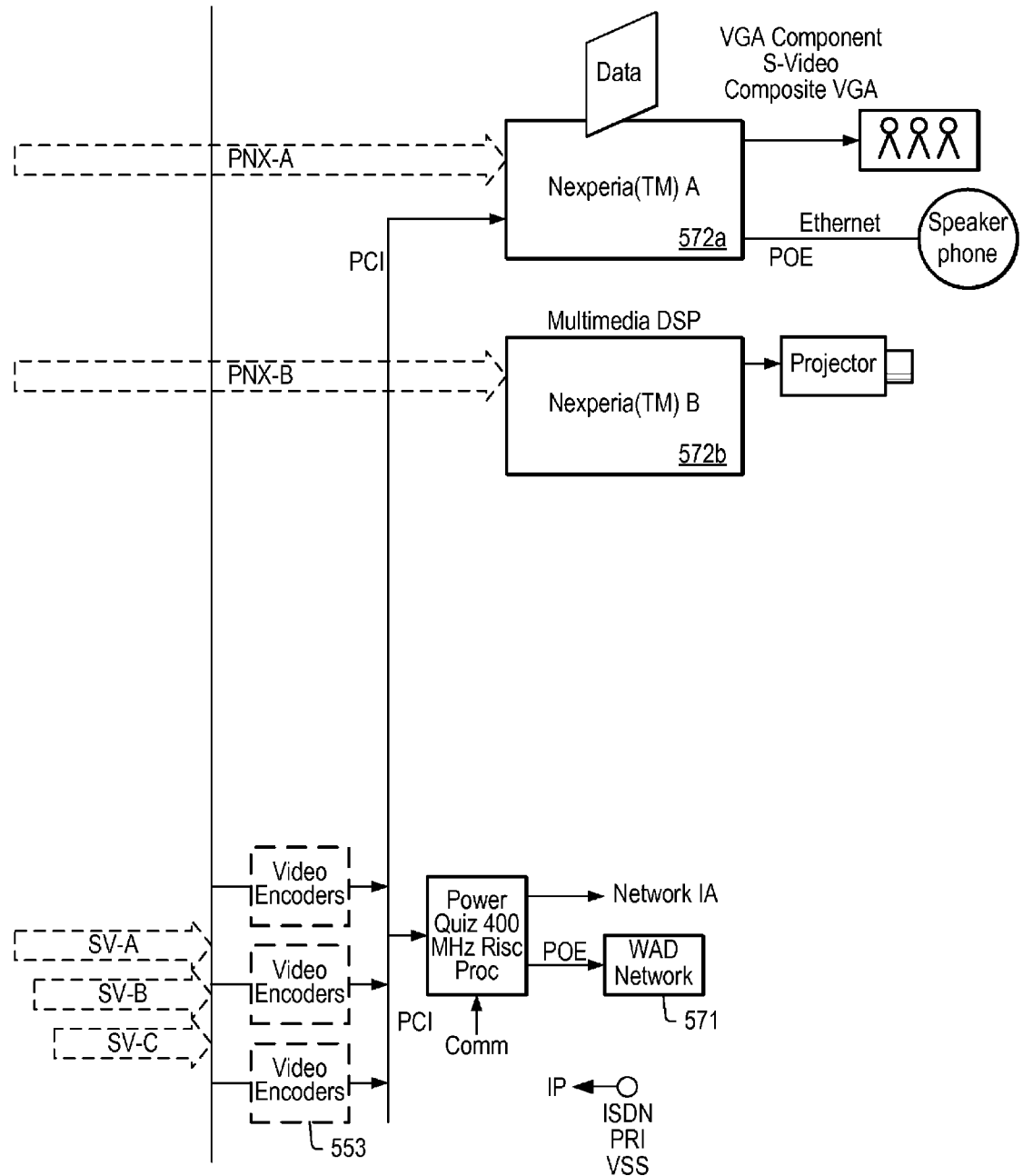

In one embodiment, one or more of the composite images may be sent over a network, e.g., to videoconferencing devices at remote endpoints. For example, outputs 586A-C are coupled to video encoders 553. As illustrated in FIG. 9D, video encoders 553 may encode output signals from the output FPGA 730 and send them over a network (e.g., a Wide Area Network (WAN) Access Device (WAD) network 571). Multimedia Digital Signal Processing (DSP) processors (e.g., Nexperia™ processors 572) may be used to process audio (e.g., Phillips Nexperia™ (PNX) signals) and/or video signals (e.g., video signals from the PCI bus).

The compositors 509 may be configured by the application software 410. In other words, the application software 410 may control which input streams are included in each of the composite images, where the respective input streams are placed within the composite image, etc.

As described above, the application software 410 may communicate with the FPGA hardware through driver software 408. For example, there may be a driver for the input FPGA 720 and another driver for the output FPGA 730.

In one embodiment, the application software 410 may control memory management for the various input streams. For example, the application software 410 may control where the Stream-to-DDR DMA module 560 writes each stream in the DDR memory 555b, may control which memory locations the compositors 509 read the streams from, etc.

The input FPGA 720 and the output FPGA 730 may both be coupled to a bus, such as PCI bus 530, which enables them to communicate with the processor 404, e.g., to receive instructions from the application software 410 through the driver software 408 as described above.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for displaying information for a videoconference, the method comprising:
    receiving a video signal from each of a plurality of endpoints of the videoconference;
    displaying the video signals from each of the plurality of endpoints concurrently on a display device;
    receiving status information from two or more of the endpoints of the videoconference, wherein the two or more endpoints includes a first endpoint, wherein the status information received from the first endpoint includes a first type of status information and a second type of status information; and
    concurrently displaying a plurality of status icons on the display device indicating the status information received from the two or more endpoints, wherein each of the status icons corresponds to one of the two or more endpoints, wherein each respective status icon is displayed proximally to the displayed video signal of the respective endpoint to which the respective status icon corresponds, wherein each respective status icon has a graphical appearance that graphically indicates at least a portion of the status information received from the respective endpoint to which the respective status icon corresponds;
    wherein said displaying the status icons comprises displaying a first status icon and a second status icon proximally to the video signal of the first endpoint, wherein the first status icon has a first graphical appearance that graphically indicates the first type of status information received from the first endpoint, and wherein the second status icon has a second graphical appearance that graphically indicates the second type of status information received from the first endpoint.

2. The method of claim 1,
    wherein the two or more endpoints includes a second endpoint;
    wherein said displaying the status icons comprises displaying a third status icon proximally to the video signal of the second endpoint, wherein the third status icon graphically indicates at least a portion of the status information received from the second endpoint, and wherein the third status icon is displayed concurrently with the first status icon and the second status icon.

3. The method of claim 1,
    wherein said receiving status information from the two or more endpoints comprises receiving status information from each of the plurality of endpoints;
    wherein said displaying the status icons comprises:
        for each respective endpoint of the plurality of endpoints, displaying a respective one or more status icons proximally to the displayed video signal of the respective endpoint, wherein the respective one or more status icons graphically indicate the status information received from the respective endpoint.

4. The method of claim 1,
    wherein the first type of status information received from the first endpoint indicates that audio is muted at the first endpoint;
    wherein said displaying the first status icon comprises displaying a first mute status icon proximally to the displayed video signal of the first endpoint, wherein the first mute status icon graphically indicates that audio is muted at the first endpoint.

5. The method of claim 4,
    wherein said receiving status information from the two or more endpoints comprises receiving status information from a second endpoint, wherein the status information from the second indicates that audio is muted at the second endpoint;
    wherein said displaying the status icons further comprises displaying a second mute status icon proximally to the displayed video signal of the second endpoint, wherein the second mute status icon graphically indicates that audio is muted at the second endpoint.

6. The method of claim 1,
    wherein the first type of status information received from the first endpoint indicates one of the following:
    a volume level for the first endpoint;
    a video source for the first endpoint; or
    camera information for the first endpoint.

7. The method of claim 1, further comprising:
    creating a composite image including the video signals from each of the plurality of endpoints and the status icons, wherein said displaying the video signals and displaying the status icons comprises displaying the composite image.

8. The method of claim 1,
    wherein said receiving the video signals comprises receiving the video signals at a particular endpoint of the videoconference, wherein said receiving the video signals comprises receiving a local video signal from the particular endpoint and receiving a remote video signal from a different endpoint that is a remote endpoint with respect to the first endpoint;
    wherein said displaying the status icons comprises:
        displaying at least one status icon proximally to the local video signal of the particular endpoint, wherein the at least one status icon displayed proximally to the local video signal of the particular endpoint graphically indicates status information received from the particular endpoint; and
        displaying at least one status icon proximally to the remote video signal of the different endpoint, wherein the at least one status icon displayed proximally to the remote video signal of the different endpoint graphically indicates status information received from the different endpoint.

9. A method for displaying information for a videoconference, the method comprising:
    receiving a video signal from each of a plurality of endpoints of the videoconference;

displaying the video signals from each of the plurality of endpoints concurrently on a display device, wherein the displayed video signals include a first displayed video signal corresponding to a first endpoint of the plurality of endpoints and a second displayed video signal corresponding to a second endpoint of the plurality of endpoints;

receiving first user input selecting the first endpoint as an endpoint to control;

displaying a control icon proximally to the first displayed video signal corresponding to the first endpoint, wherein the control icon has a pictorial appearance that pictorially indicates that the first endpoint is selected for controlling one or more properties of the first endpoint;

receiving second user input selecting the second endpoint as the endpoint to control, wherein the second user input is received after said displaying the control icon proximally to the first displayed video signal; and re-displaying the control icon proximally to the second displayed video signal corresponding to the second endpoint in response to the second user input, wherein said re-displaying the control icon proximally to the second displayed video signal indicates that the second endpoint has been selected as the endpoint to control instead of the first endpoint.

10. The method of claim 9,
wherein said displaying the control icon proximally to the first displayed video signal corresponding to the first endpoint visually indicates that the first endpoint is selected for controlling one or more of the following properties of the first endpoint:
panning of a camera at the first endpoint;
tilting of a camera at the first endpoint;
zooming of a camera at the first endpoint;
selection of a video source at the first endpoint.

11. A videoconferencing device configured to:
receive a video signal from each of a plurality of endpoints of a videoconference;
display the video signals from each of the plurality of endpoints concurrently on a display device;
receive status information from two or more of the endpoints of the videoconference, wherein the two or more endpoints includes a first endpoint, wherein the status information received from the first endpoint includes a first type of status information and a second type of status information; and
concurrently display a plurality of status icons on the display device indicating the status information received from the two or more endpoints, wherein each of the status icons corresponds to one of the two or more endpoints, wherein each respective status icon is displayed proximally to the displayed video signal of the respective endpoint to which the respective status icon corresponds, wherein each-respective status icon has a graphical appearance that graphically indicates at least a portion of the status information received from the respective endpoint to which the respective status icon corresponds;
wherein said displaying the status icons comprises displaying a first status icon and a second status icon proximally to the video signal of the first endpoint, wherein the first status icon has a first graphical appearance that graphically indicates the first type of status information received from the first endpoint, and wherein the second status icon has a second graphical appearance that graphically indicates the second type of status information received from the first endpoint.

12. The videoconferencing device of claim 11,
wherein the two or more endpoints includes a second endpoint;
wherein said displaying the status icons comprises displaying a third status icon proximally to the video signal of the second endpoint, wherein the third status icon graphically indicates at least a portion of the status information received from the second endpoint, and wherein the third status icon is displayed concurrently with the first status icon and the second status icon.

13. The videoconferencing device of claim 11,
wherein said receiving status information from the two or more endpoints comprises receiving status information from each of the plurality of endpoints;
wherein said displaying the status icons comprises:
for each respective endpoint of the plurality of endpoints, displaying a respective one or more status icons proximally to the displayed video signal of the respective endpoint, wherein the respective one or more status icons graphically indicate the status information received from the respective endpoint.

14. The videoconferencing device of claim 11,
wherein the first type of status information received from the first endpoint indicates that audio is muted at the first endpoint;
wherein said displaying the first status icon comprises displaying a first mute status icon proximally to the displayed video signal of the first endpoint, wherein the first mute status icon graphically indicates that audio is muted at the first endpoint.

15. The videoconferencing device of claim 11,
wherein the videoconferencing device is configured to create a composite image including the video signals from each of the plurality of endpoints and the status icons, wherein said displaying the video signals and displaying the status icons comprises displaying the composite image.

16. A videoconferencing device configured to:
receive a video signal from each of a plurality of endpoints of the videoconference;
display the video signals from each of the plurality of endpoints concurrently on a display device, wherein the displayed video signals include a first displayed video signal corresponding to a first endpoint of the plurality of endpoints and a second displayed video signal corresponding to a second endpoint of the plurality of endpoints;
receive first user input selecting the first endpoint as an endpoint to control;
display a control icon proximally to the first displayed video signal corresponding to the first endpoint, wherein the control icon has a pictorial appearance that pictorially indicates that the first endpoint is selected for controlling one or more properties of the first endpoint;
receive second user input selecting the second endpoint as the endpoint to control, wherein the second user input is received after said displaying the control icon proximally to the first displayed video signal; and
re-display the control icon proximally to the second displayed video signal corresponding to the second endpoint in response to the second user input, wherein said re-displaying the control icon proximally to the second displayed video signal indicates that the second endpoint has been selected as the endpoint to control instead of the first endpoint.

* * * * *